US006694482B1

(12) United States Patent
Arellano et al.

(10) Patent No.: US 6,694,482 B1
(45) Date of Patent: Feb. 17, 2004

(54) SYSTEM AND METHODS FOR AN ARCHITECTURAL FRAMEWORK FOR DESIGN OF AN ADAPTIVE, PERSONALIZED, INTERACTIVE CONTENT DELIVERY SYSTEM

(75) Inventors: Javier B. Arellano, Austin, TX (US); Abha S. Divine, Austin, TX (US); Zuzana K. Dobes, Austin, TX (US); Guangtian Liu, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/393,281

(22) Filed: Sep. 10, 1999

Related U.S. Application Data

(60) Provisional application No. 60/099,947, filed on Sep. 11, 1998.

(51) Int. Cl.[7] .......................... G06F 17/30; G09F 17/29
(52) U.S. Cl. ................. 715/500.1; 715/513; 715/501.1; 709/101; 717/108; 717/165
(58) Field of Search .......................... 707/500.1, 103 Y, 707/104.1, 101; 715/500.1, 501.1

(56) References Cited

U.S. PATENT DOCUMENTS

| | | | | |
|---|---|---|---|---|
| 6,055,542 A | * | 4/2000 | Nielsen et al. | 707/104.1 |
| 6,166,732 A | * | 12/2000 | Mitchell et al. | 345/733 |
| 6,201,948 B1 | * | 3/2001 | Cook et al. | 434/350 |
| 6,448,980 B1 | * | 9/2002 | Kumar et al. | 345/745 |

OTHER PUBLICATIONS

Kaoru Kobayashi, Information Presentation based on Individual User Interests, 1998, Second Internation Conference, IEEE, 375–383.*

Nikitas Sgouros, Dynamic Dramatization of Multimedia Story Presentations, 1997 ACM, 87–94.*
Michael Murtaugh, The Automatist Storytelling System, 1996 Massachusetts Institute of Technology, Masters Thesis.*
Brooks, K.M. "Do Story Agents Use Rocking Chairs: The Theory and Implementation of One Model for Computational Narrative", Proceedings of the Fourth ACM International Multi–Media Conference on Intelligent User Interfaces, ACM Press 1996.
Murtaugh, M. "The Automatist Storytelling System: Putting the Editor's Knowledge in Software", MIT Media lab, Masters Thesis, 1996.
Maybury, M. (Intelligent Multi–Media Interfaces), AAA/ MIT Press, Cambridge, MA, 1993, Chapter 5: S.K. Feiner et al., Automating the Generation of Coordinated Multimedia Explanations.
Szekely, P. "Restrospective and Challenges for Model–Based Interface Development", USC Information Sciences Institute, Marina del Rey, CA, 1996.

(List continued on next page.)

*Primary Examiner*—Joseph H. Feild
*Assistant Examiner*—Matthew Ludwig
(74) *Attorney, Agent, or Firm*—Greenblum & Bernstein, P.L.C.

(57) ABSTRACT

System and methods for creating and delivering interactive multimedia content that can dynamically adapt to at least one user. At least one user model is created for at least one user. The at least one user model represents interests and trends of the at least one user. A multimedia story is developed based on the at least one user model. A customized presentation of the multimedia story is generated. The at least one multimedia story allows for multiple presentations of the multimedia story. The customized presentation is displayed to the at least one user. The customized presentation is modified based on input from the at least one user.

11 Claims, 32 Drawing Sheets

OTHER PUBLICATIONS

Stanfill, C. et al., "Toward Memory–Based Reasoning", Communications of the ACM, vol. 29, No. 12, ACM Press, Dec., 1996.

Orwant, J., "Doppelgänger Goes To School: Machine Learning for User Modeling", MIT MS Thesis Sep., 1993.

Orwant, J., "For want of a bit the user was lost: Cheap user modeling", IBM Systems Journal, vol. 35, Nos. 3 & 4, pp. 398–416, 1996.

Shardanand, U. "Social Information Filtering for Music Recommendation", MIT MS Thesis, 1994.

From Animals to Animals 2: Proceedings of the Second International Conference on Simulation of Adaptive Behavior, Maes, P., MIT Media Laboratory 1992, Behavior Based Artificial Intelligence.

* cited by examiner

The Dynamic Storytelling Structure

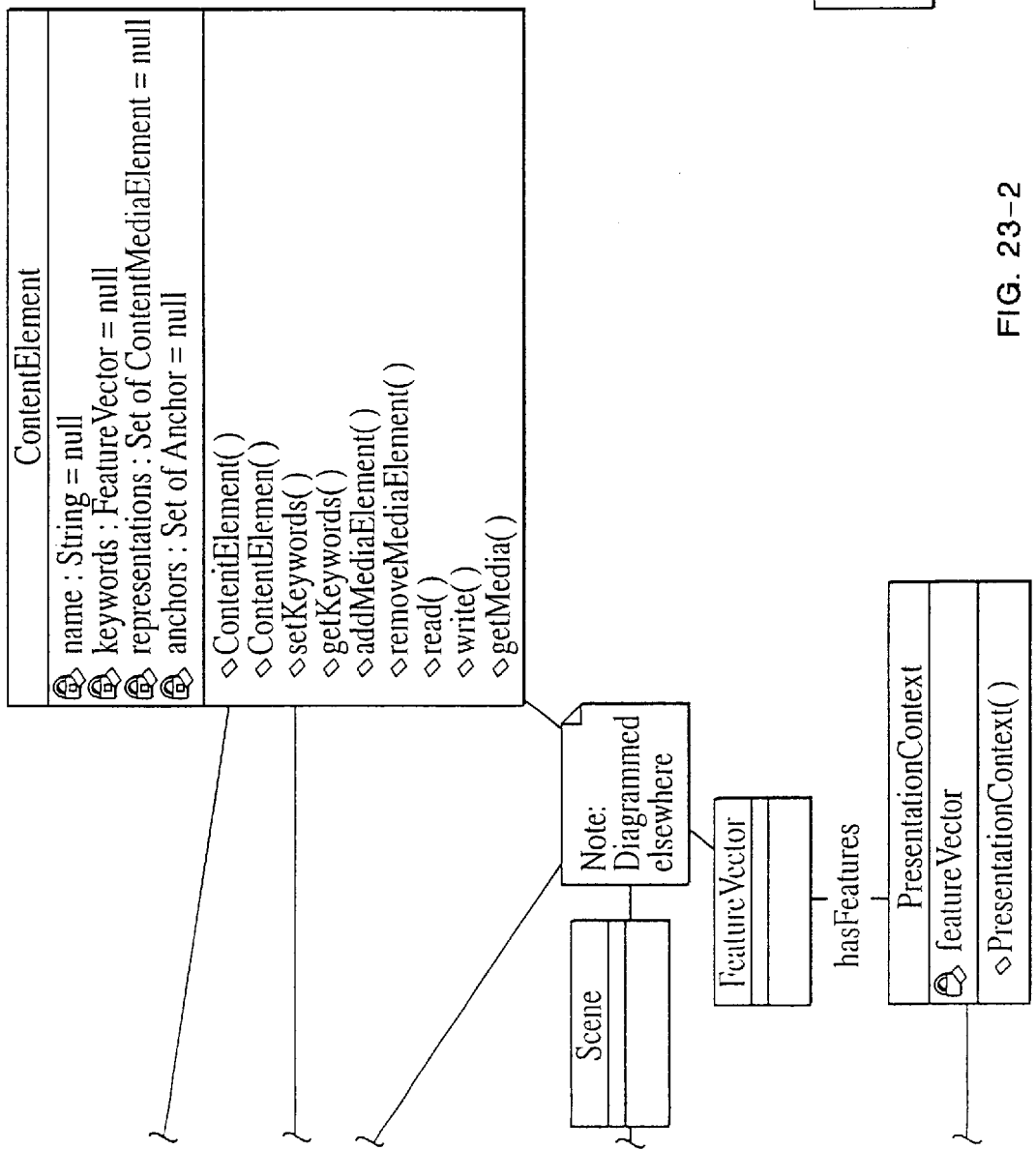

SYSTEM AND METHODS FOR AN ARCHITECTURAL FRAMEWORK FOR DESIGN OF AN ADAPTIVE, PERSONALIZED, INTERACTIVE CONTENT DELIVERY SYSTEM

CROSS-REFERENCE TO RELATED APPLICATIONS

This invention claims the benefit of U.S. Provisional Application No. 60/099,947, filed on Sep. 11, 1998, the contents of which is expressly incorporated by reference herein.

BACKGROUND OF THE INVENTION

1. Field of the Invention

This invention relates to architectural frameworks for development of multimedia applications, and more specifically to architectural frameworks for developing adaptive, personalized, interactive multimedia applications and services.

2. Background and Material Information

In general, designing and implementing interactive systems is a complex and lengthy task. If one adds multimedia to the development equation, the level of complexity, the content variability and the required management support immediately soars and can overwhelm the development process. On the other hand, there presently exists a very dynamic and rich environment that potentially offers a business opportunity allowing one to build a family of applications that can be strongly differentiated by leveraging the same rich and complex content. Thus, a double edged sword exists.

If one examines the requirements, present and future, of information, more specifically multimedia information, one discovers that in general these requirements are a response to the "dynamics of information". These dynamics can be characterized by: constantly changing information; broad user population; and heterogenous landscape of delivery devices. If one grafts onto this picture the dynamics of collaboration or computer-supported work in synchronous or asynchronous mode, and potentially the technical problems are further compounded by the opportunity for differentiated and value-added services increases, i.e., the double-edged sword once again.

The best way to understand a system is to have an abstraction that describes a simpler picture of the structure and the machinery. A metaphoric vehicle is useful in that it allows framing of a problem and likewise offers a solution that supports and promotes flexibility, expressiveness, and scalability in information design and display. One can say that a multi-media presentation is like "telling a story". The presentation author is attempting to convey a communicative intent and more than likely it was constructed with a particular audience in mind, as well as a specific context and medium.

The computational narrative model, as disclosed in Brooks, K. M., "Do Agent Stories Use Rocking Chairs: The Theory and Implementation of One Model for Computational Narrative", Processings of the Fourth ACM International Multimedia Conference on Intelligent User Interfaces, ACM Press 1996 and Murtaugh, M. "The Automatist Storytelling System: Putting the Editor's Knowledge in Software", MIT MS Thesis, 1996, offers a metaphor for creating tools that are capable of going beyond traditional storytelling by enhancing the editorial through the leveraging of the computer's ability to support rapid decision making. According to Brooks, narrative represents the universe of story elements for a given story, i.e., the collection of possibility, and narration as a specific navigation through that universe.

As shown in FIG. 1, the process of computational storytelling involves the author supplying the elements of the story and the structure to organize the story elements. The agent takes the elements of the story and the structure and generates a story, more precisely, a narrative, and presents the "story" to an audience. The audience reacts and generates feedback to the agent. The agent acting as proxy for the author can react to the feedback by modifying the presentation.

Some current conceptual views regarding the techniques or technical strategies that are related to developing a framework for creating and delivering interactive multimedia applications include: dynamic presentation, behavior-based artificial intelligence, memory-based learning, and user modeling.

Regarding dynamic presentation, Maybury, M. "Intelligent Multimedia Interfaces", AAAI/MIT Press, Cambridge, Mass., 1993, discloses that automatic multimedia presentation involves the stages of content selection (i.e., what to say), media allocation (i.e., what media to present it in), and media realization (i.e., how to say it). The focus is the media allocation and realization phase. More specifically, how to create presentations without knowing all "facts" during design time. The basic objective is to enable the creation of user interfaces that are sufficiently flexible and adaptive to "re-invent" themselves at run-time. To support this flexibility and adaptability, an interface needs to be developed not to a final fixed form, but to some protean form that can be reshaped at run time, time after time, to meet the requirements of any situation that invalidates its current form.

Szekely P., "Retrospective and Challenges for Model-Based Interface Development", USC Information Sciences Institute, Marina del Rey, Calif., 1996, proposes one architecture. Szekely discloses that a model-based user interface calls for a model of the interface that is organized as three levels of abstraction: task and domain model for the application, an abstract user interface specification, and a concrete user interface specification. The task model represents the task that the user will undertake to perform with the application. The domain model represents the data and the operations that are part of an application.

The second level, according to Szekely, is the abstract user interface specification. At this level, an interface is defined in terms of abstract interaction units, information elements, and presentation units. The abstract interaction units are low-level interactions such as showing a presentation unit. Information elements represent data such as attributes extracted from the domain model. Presentation units are abstractions of windows and specify collections of abstract presentation units and information elements that are to be treated as a unit. Basically, the abstract user interface specification abstractly specifies the way information will be presented in the interface and form for interaction with the information.

The third level, according to Szekely, is the concrete user interface specification that specifies rendering styles for the presentation units, i.e., widgets. Different model-based user interface (UI) frameworks differ in what models they provide. Szekely discloses that some frameworks have one model but not the other two, while in other cases, only one model is defined. FIG. 2 is a flowchart showing a generic model-based presentation system as disclosed in Szekely.

An alternative reasoning framework has emerged in Artificial Intelligence circles called Behavior-Based AI (BBAI) as disclosed in Maes, P. "Behavior-Based Artificial Intelligence", Proceedings of Second Animat Conference on Adaptive Behavior, 1992. This new approach represents more of a different way of thinking about a problem domain than an alternative reasoning technique. The knowledge-based approach involves capturing the rules to solve a domain. In contrast, the BBAI approach relies on a set of lower level competencies which are each experts at solving one part of the larger problem domain as disclosed in Brooks.

Additionally, the BBAI approach tends to emphasize the system behavior as opposed to the system knowledge. Furthermore, BBAI stresses that the system should be situated in its environment and have direct (or as close as possible) access to the problem domain. This framework enables a system to bring together different classes of reasoning techniques, heuristic, statistical, etc., and incorporate each application of a technique into a lower-level competency module or "expert". In effect, these modules come together to form a multi-agent system.

Another learning technique, as disclosed in Stanfield, C. et al., "Toward Memory-Based Reasoning", Communications of the ACM, 20(12), ACM Press, 1986, is memory-based learning. Basically, memory-based learning entails comparing a new situation against each of the situations which have occurred before. Given a new situation, a memory-based learning agent looks at the actions taken in N of the "closest" situations or "nearest neighbors" to predict the action for a new situation. FIG. 3 shows a diagram of the memory-based reasoning approach.

User modeling is an inexact science but its predictions need not be perfect to be useful. User models can range from simply storing a bit indicating if the user is a novice or expert in terms of an application, to a rich, complex snapshot of the user's interest and preferences. Once a universe of user models is collected and maintained, the models may serve as data for further analysis to find pattern and trends in this universe. These are some of many critical issues relevant to user modeling.

User models may be either pragmatic or cognitive as disclosed in Orwant, J, "Doppelganger Goes To School: Machine Learning for User Modeling,", MIT MS Thesis, 1993. The cognitive type user models are not connected to any application or applications in particular. This type of user model is attempting to capture a user's beliefs, goals and plans in a general sense. A pragmatic user model is not driven by a cognitive model but by the practical aspects of the environment, e.g., applications. The pragmatic user model can be characterized by the collection of raw observational data and making sense of the data after the fact. In another sense, the cognitive model is a top down approach and the pragmatic model is a bottom up approach.

Conceptually, individuals can take on particular roles, e.g., business, leisure, parental, professional. These are defined as persona in a user modeling sense. Personae could be utilized to partition the user model space into more manageable chunks.

A pragmatic user model can make use of filtering techniques. Content-based filtering involves selecting items for the user based on correlations between content of the items and the user's preferences. For example, a personalized TV program guide uses information about a television program, such as the program's type and its level of violence to predict whether or not to recommend and include the show in a personalized line-up. Generally, users rely on exploration to discover new items of interest, i.e., serendipitous items. By definition, content-based filtering has no inherent capability to generate these sort of items. In practice, one must add special purpose techniques to add these capabilities to content-based filtering to introduce serendipity. For example, a user might be unaware of their interest in true crime shows until she actually comes across "America's Most Wanted". Assuming no indications of this trend had previously surfaced, content-based filtering would have never detected this particular interest. Content-based filtering simply does not allow a user to expand their interests.

Social-based filtering is one potential solution to the serendipity dilemma. Social-based filtering basically attempts to exploit similarities between the profiles of different users to filter content. Social-based filtering can be an extension of content-based filtering. Once a user model is constructed and is being maintained, social-based filtering algorithms can compare this model to other user models and weigh each model for the level of similarity with the user model. Orwant, J., "For Want of a Bit The User Was Lost: Cheap User Modeling", IBM Systems Journal, vol. 35, Nos 3&4, 1996 and Shardanand, U., "Social Information Filtering for Music Recommendation", MIT MS Thesis, 1994 disclose algorithms for computing similarity between user models.

SUMMARY OF THE INVENTION

Accordingly, the present invention is directed to a method for design of an adaptive personalized interactive content delivery system that substantially obviates one or more of the problems arising from the limitations and disadvantages of the related art.

It is an object of the present invention to provide an architectural framework that is composed of a collection of classes for building interactive multimedia applications and services.

It is a further object of the present invention to provide an architectural framework that will enable a developer to build up locations that deliver services that dynamically adapt to the user, the content, and the delivery context, resulting in an effective contextual personalized on-line experience.

Another object of the present invention is to provide an architectural framework that supports and promotes the creation of reusable components for building personalized interactive multimedia presentations of complex applications.

Accordingly, one aspect of the present invention is directed to a method for creating and delivering an interactive multimedia application that can dynamically adapt to at least one user. At least one user model is created for at least one user, the at least one user model represents interests and trends of the at least one user. A multimedia story is developed based on the at least one user model. A customized presentation of the multimedia story is generated where the at least one multimedia story allows for multiple presentations of the multimedia story. The customized presentation is displayed to the at least one user. The customized presentation is modified based on input from the at least one user.

In another aspect of the present invention, the story includes a protean-like narrative.

In still another aspect of the present invention, the creating includes: gathering data from the at least one user; analyzing a history of the at least one user; monitoring data related to the at least one user; detecting patterns and trends of the at least one user; and preparing the at least one user model based on the gathering, analyzing, monitoring, and detecting. The at least one user model is modified periodically based on information obtained from periodically repeating the gathering, analyzing, monitoring, and detecting.

In a further aspect of the present invention, the at least one user model includes a set of models.

In another aspect of the present invention, the story includes at least one content element. The at least one content element characterizes data of the interactive multimedia application. The at least one content element is representable in multiple forms.

In still another aspect of the present invention, the at least one user model comprises a set of models.

In a further aspect of the present invention, the multiple forms include text, audio, video, image, or multimedia.

In another aspect of the present invention, the invention includes filtering the at least one content element to produce a subset of the at least one content element, each content element in the subset of at least one content elements selected based on semantics of the filtering.

In still another aspect of the present invention, the invention includes assembling the subset of at least one content elements to produce the multimedia story. The multimedia story may be personalized to the at least one user.

In a further aspect of the present invention, the generating includes: determining the delivery environment of the at least one user; determining the style look and feel for the presentation; determining the narrative context for the presentation. The narrative context defined by the semantics of the interactive multimedia application; and creating a customized presentation of the multimedia story based on the delivery environment, the style look and feel, and the narrative context.

In another aspect of the present invention, a weighted value may be assigned to each interest and trend of the at least one user. The weighted value represents the relative importance of each interest and trend with respect to the at least one user's apparent interests.

In still another aspect of the present invention, the interactive multimedia application may be created using object-oriented design techniques.

In a further aspect of the present invention, the invention is directed to a method for creating and delivering an interactive multimedia application that can dynamically adapt to at least one user that includes: creating a story engine, the story engine may be created by the interactive multimedia application; creating a user model manager, the user model manager may be created by the interactive multimedia application; providing the story engine with application-specific information and user information; providing the story engine with a user model from the user model manager, the user model represents interests and trends of the at least one user; providing the story engine with a narrative structure, the narrative structure defined by the semantics of the interactive multimedia application; producing user-relevant content, the user-related content may be produced by applying filters to the content model, the user model may be used for filtering purposes; creating a presentation engine, the presentation engine may be created by the interactive multimedia application; providing the presentation engine with the narrative structure, content model, and a presentation model, the content model may be empty; generating an abstract presentation defined by the presentation model, the abstract presentation may be generated by the presentation engine; generating a concrete presentation by using the abstract presentation's heuristics, the concrete presentation may be generated by the presentation engine; and displaying the concrete presentation by the presentation engine, wherein the abstract presentation and the presentation engine autonomously handle interaction scenarios, and trends and patterns are periodically recomputed based on interaction histories and the user models, the interactive multimedia application may be self-improving and self-sustaining.

In another aspect of the present invention, the interactive multimedia application may be created using object-oriented design techniques.

In still another aspect of the present invention, the interactive multimedia application may be created using JAVA.

In a further aspect of the present invention, the invention is directed to a system for creating and delivering interactive multimedia applications that dynamically adapt to a user that include: a user modeling subsystem where the user modeling subsystem creates and maintains at least one user model for each user, each at least one user model represents interests and trends of each user; a story engine subsystem where the story engine subsystem selects appropriate content elements and collects and organizes these elements in accordance with a narrative framework; and a presentation subsystem where the presentation subsystem generates a presentation to the user, the presentation generated uses the narrative framework.

In another aspect of the present invention, the user modeling subsystem includes: a user model editor; a user modeling manager; an analysis engine; and a user model database.

In still another aspect of the present invention, the story engine subsystem includes: a first database where the first database contains a content model library, the first database accesses content from a content database; and a second database where the second database contains a story template library.

In a further aspect of the present invention, the presentation subsystem includes: a first database where the first database contains at least one presentation models; a presentation builder; a second database where the second database contains a concrete presentation library; and a presentation engine.

In another aspect of the present invention, the content elements may represent pieces of information that can be presented via one or more media types.

In still another aspect of the present invention, the presentation may be constrained by a narrative style, narrative context, and demands of the delivery environment of the user.

Other exemplary embodiments and advantages of the present invention may be ascertained by reviewing the present disclosure and the accompanying drawings.

DETAILED DESCRIPTION OF THE PREFERRED EMBODIMENTS

The particulars shown herein are by way of example and for purposes of illustrative discussion of the embodiments of the present invention only and are presented and the cause of providing a useful and readily understood description of the principles and conceptual aspects of the present invention. In this regard, no attempt is made to show structural details of the present invention in more detail than is necessary for the fundamental understanding of the present invention. The description taken with the drawings make it apparent to those skilled in the art how the several forms of the present invention may be embodied in practice.

The present invention is an application framework for creating and delivering interactive multimedia applications and/or services. The applications framework according to the present invention will enable the deployment of applications that dynamically adapt to the user through the personalization of content and presentation. The applications framework may be a software infrastructure that supports and promotes the creation of reusable components for building personalized interactive multimedia presentations of complex applications. In addition, the applications framework according to the present invention, is a software foundation for enabling community and collaboration in a networked world.

The applications framework, according to the present invention, allows one to create an application-specific structure and utilizes structure to create multiple presentations from the same set of application-specific content where agents with different style goals or communicative intent make sequencing and editing decisions constrained by the user's preferences and the characteristics of the content and the delivery device.

As discussed previously, the best way to understand a system is to have an abstraction that describes a simpler picture of the structure and the machinery. The architecture of an applications framework according to the present invention may be described by a series of abstractions, each one giving more and more concrete artifacts. The application framework according to the present invention encompasses many elements ranging from a dynamic presentation system, a multiagent system, to a memory-based user modeling system and a multi-paradigm application framework.

Reflecting on the originally discussed metaphor, the present invention decomposes the agent that inhabits the dynamic storytelling structure down to a set of agents, each agent corresponding to an area of competency. These include user modeling, storytelling, and presentation design/generation. This model subscribes to the behavior-based AI approach where each agent, an expert in its own right, brings together their own lower lever competencies to create a higher level competence-emergent behavior.

Figure 1:
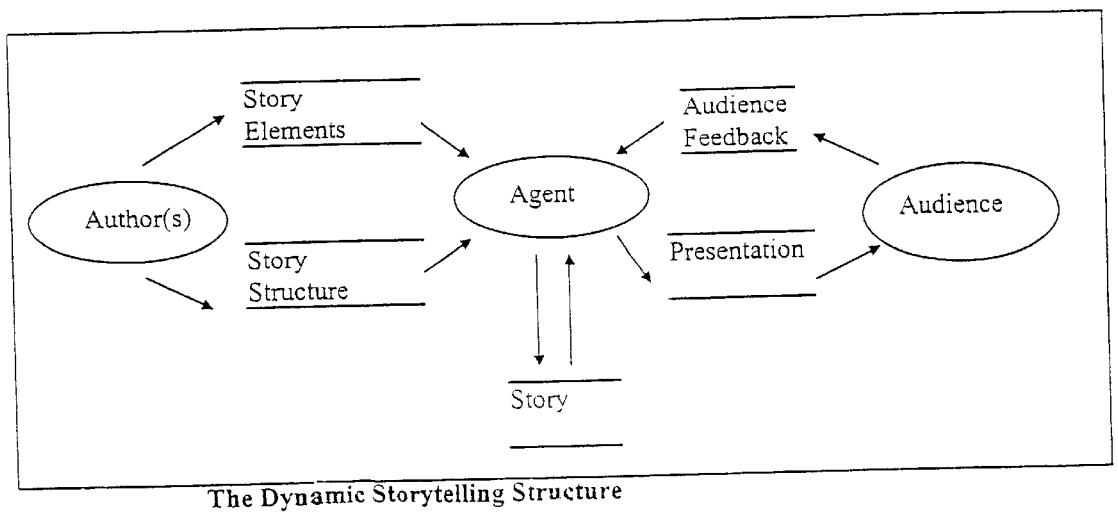
FIG. 1 is a flowchart showing a conventional dynamic storytelling structure.
Figure 2:
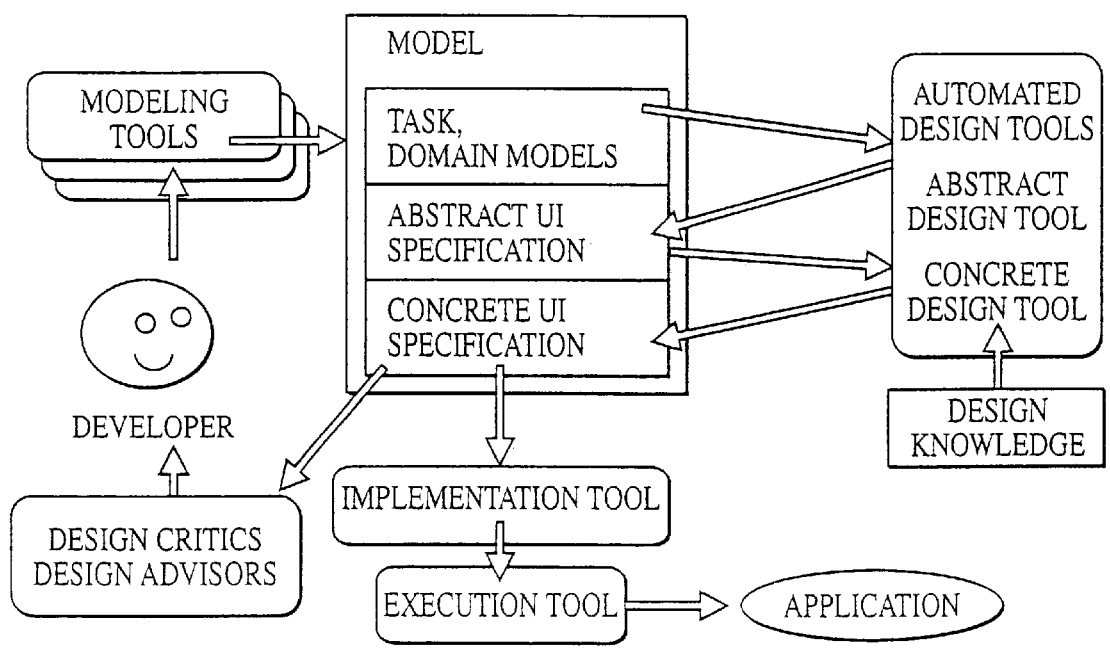
FIG. 2 is a flowchart showing a conventional generic model-based presentation system.
Figure 3:
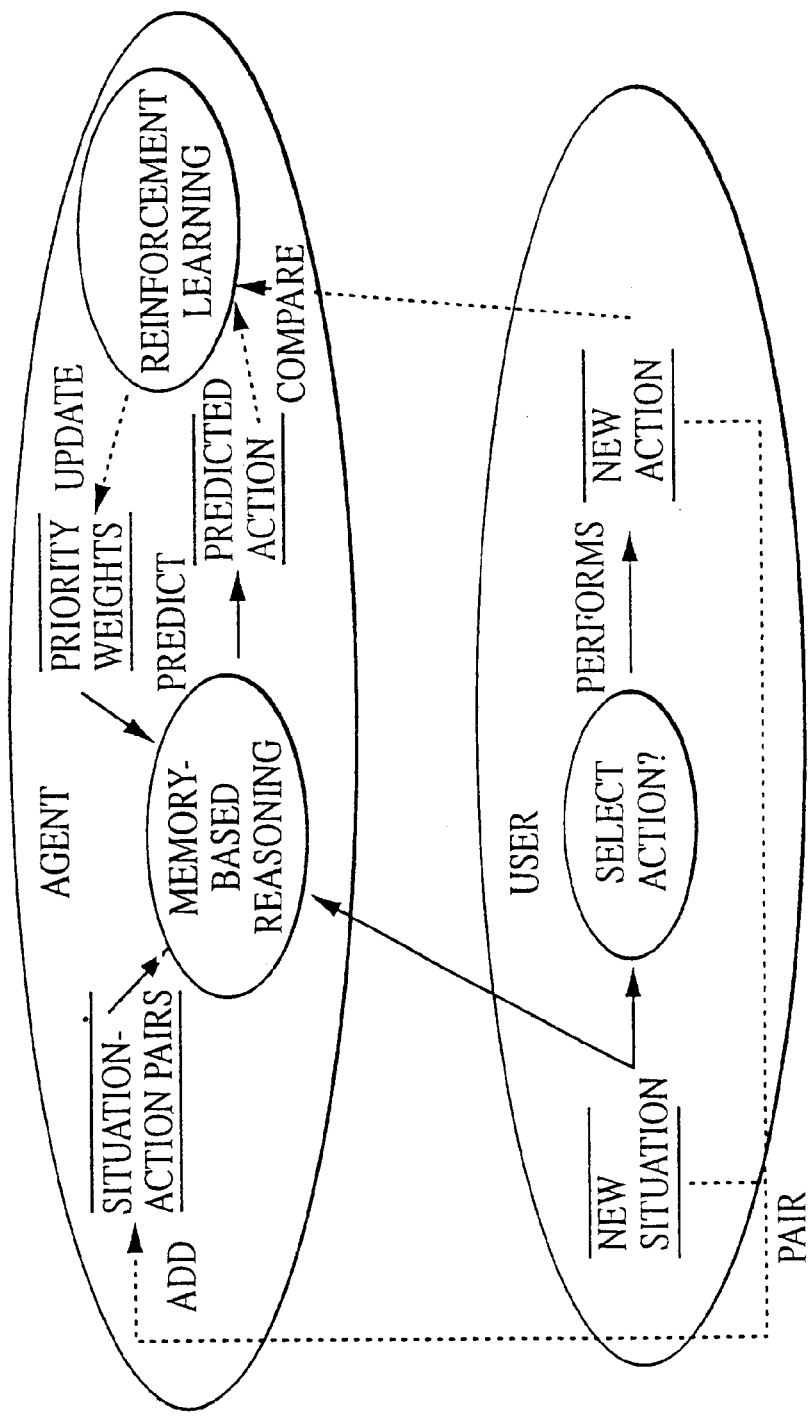
FIG. 3 is a diagram showing a conventional memory-based reasoning system.
Figure 4:
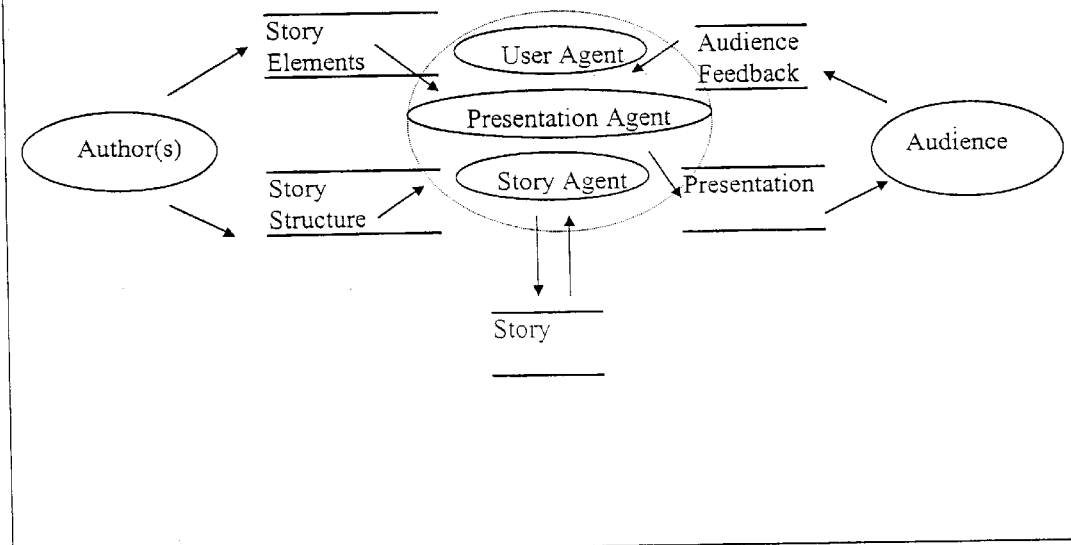
FIG. 4 is a flowchart showing a multiagent storytelling system according to the present invention.

As discussed previously, the requirements for media information is a response to the dynamics of information where the dynamics are characterized by: constantly changing information, broad user population, and heterogeneous landscape of delivery devices. The architectural framework, according to the present invention, solves the challenge of constantly changing information with the story agent, the challenge of broad user population with the user agent, and the challenge of heterogeneous landscape of delivery devices with the presentation agent. FIG. 4 shows a diagram of a multiagent storytelling system according to the present invention. The user agent, story agent and presentation agent, according to the present invention, will now be discussed in more detail.

User Agent

The User Agent embodies the user modeling aspect of the architectural framework system, according to the present invention. In effect, the user modeling system is the user to the system. It encompasses several components that together enable the capture of relevant interaction data, the storage and representation of a user's interests, trends, etc., and the capability to manage and analyze the resulting user data. The User Agent in the architectural framework, according to the present invention, handles capturing user feedback, maintaining the user's profile, structuring interests and preferences, and making sense of a user's interaction history. A User Model Editor allows the end user and/or administrator to specify the user's interest along with a measure of confidence.

A sensor is used to capture user interaction at the source and understands how to extract the relevant information from the user feedback. The sensor may be in the form of a software program. The sensor acts as a proxy for the user modeling system. Different kinds of sensors may be employed to gather information at their respective sources. A sensor knows how often to gather data, what data to monitor, and how to decode the present event into user profile data. A sensor may be one or several software components, where each component may capture and/or monitor different user information.

The user modeling system, according to the present invention, provides for a repository for representations of each users' preferences. A user's preference and taste, along with demographic information, constitutes a user model. Additionally, each user model needs to maintain some form of history that describes the relevant "discourse" of interaction that supports the user's preferences contained therein. Sensors provide the interaction data.

In the architectural framework, according to the present invention, the nature of the representation of a user model is driven by the feature-based content that characterize the application data. As a result, the user models are structured as a set of models for each domain or application (e.g., TV viewing, shopping, etc.). This is in contrast to the persona concept described previously. Persona relate to a role rather than an application's specific profile. A persona is a model that exists independent of an application oriented or a domain oriented model.

In order for the user models to be useful to other components in the architectural framework of the present invention (e.g., the Story Agent), the User Agent is introspective and computes/detects trends and patterns. The User Agent constantly re-evaluates the importance of features and the values the features can hold in the domain oriented models. In the architectural framework according to the present invention, the User Agent includes a reasoning component, an analysis engine, that analyzes a user's data and computes correlations between features and feature-values as defined by the memory based learning framework described previously.

Story Agent

The Story Agent according to the architectural framework of the present invention, selects the appropriate content elements and collects and organizes these elements as prescribed by an appropriate class of narrative framework. This narrative framework represents a "prototype story" that is utilized by the Presentation Agent to generate a customized presentation.

The process of selecting content is driven by the content types as specified by the content model. The User Agent's user model is utilized in the selection process. As described previously, the User Agent is responsible for analyzing a user's data and computing correlations between features and feature-values and carrying out its role in the memory based learning scheme.

Given some application-specific criteria, the Story Agent is responsible for choosing the best content elements by using the embedded logic provided by the narrative framework. Once the story agent has selected the "best set" of content elements, the narrative framework now populated with content elements is supplied to the Presentation Agent's computation of the final story's look and feel.

Presentation Agent

Using the dynamic storytelling metaphor discussed previously, the Presentation Agent according to the present invention takes the dynamically generated narrative (the populated narrative framework) and creates a presentation. The Presentation Agent generates a presentation by design where the design is constrained by a narrative style (narrative context), by a particular look and feel (style context), and by the demands of the delivery environment (delivery context). The agency of this agent is brought to life by specifying an abstract representation of a presentation. The model based approach to user interface design supports the idea of an abstract, declarative representation of a user interface. The approach according to the present invention, borrows from this approach, but only superficially, mainly in high level terms.

The presentation generation aspect of the architectural framework according to the present invention is a novel yet simple solution. Presentation design involves four types of components: abstract presentations, concrete presentations, reactors, and design constraints.

An abstract presentation is a meta-presentation. An abstract presentation is a loose design representation of a concrete presentation. Abstract presentations may have parts that themselves are abstract presentations. This results in the creation of an hierarchically composed presentation. Defining a modular loosely structured presentation not restricted to a final form and layout enables the creation and maintenance of flexible and dynamic multimedia presentations. An abstract presentation maps to and represents a content element. It serves as the link between interface and content.

Concrete presentations are either standard user interface components, i.e., widgets or wrapper-style components that repurpose other widgets. A wrapper is a software component (e.g. an object) that hides the real software or device that is being used. The concrete presentation objects are the actual user interface objects that appear on the display.

Reactors are action objects that associate concrete presentation events and an operation on a content element. Reactors are registered (i.e., associated with appropriate software components to handle the operation) and managed by abstract presentations.

Design constraints are heuristics that guide in the final make-up of the presentation, including layout, style and content make-up of the presentation. These rules can be classified into three categories: narrative context, style context, and delivery context. Narrative context are rules for narrative-specific realization, e.g., in a personalized TV program guide creating programs, line-ups along thematic lines. Style context are rules for style, look and feel, e.g., a tabular view versus a 3D landscape of the schedule in a personalized TV program schedule. Delivery context are rules that deal with the delivery environment, e.g., real estate allocated for a desk top versus a PDA (Personal Digital Assistant), connection protocol, browser, modem speed, etc.

Figure 5:
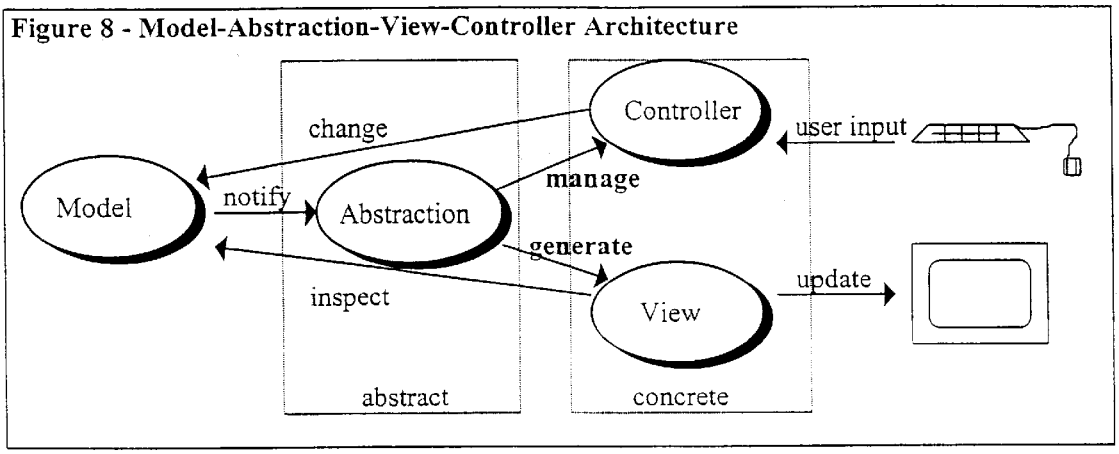
FIG. 5 is a diagram showing a model abstraction view controller architecture according to the present invention.

The abstract presentation and design constraints represent the declarative aspects of the architectural framework according to the present invention, and together they serve as an abstraction of the final interface. As shown in FIG. 5, this framework is an extension of the known Model-View-Controller (MVC) user interface architecture. The MVC paradigm partitions a user interface architecture into three components: a model (an abstraction of the problem domain), a view (a visual representation of the model or part of the model), and a controller (an input handler). Typically, each of these components is a collection of one or more objects.

In the known MVC user interface architecture, the user issues some form of input or command which is captured by the controller. The controller, in turn, takes the command (e.g., mouse click, key stroke, speech utterance, etc.) and translates it into an action on a model object. A controller is associated with a view. The view displays the state of the model and relies on a dependency mechanism whereby the view registers itself as dependent on the model. As a result, whenever the model undergoes a change, the model broadcasts a notification to all dependent views that a change has occurred. The views in turn query the model to retrieve the details of the change and update themselves accordingly.

The model encapsulates the semantics of application objects. Subcomponents of the model hide the details of communication, database access, etc. The model is not aware of the views (or the controllers for that matter) but only through anonymous message broadcasting does the model communicate with its dependent views.

The MVC architecture promotes modularity and the decoupling of application data from the mechanisms to view and manipulate that data. So as a result, this allows for software reuse, both in a design and implementation sense. In theory, one can reuse a model in different application, i.e., the same model, different views. Additionally, one may reuse a view (or controller) in different applications, i.e., same view, different models.

The known MVC architecture assumes a set of views statically bound to each model. The architectural framework according to the present invention, has extended this architecture by decomposing the view controller compliment set into an abstract presentation component and a concrete presentation component as shown in FIG. 5. The concrete component encapsulates the traditional view-controller objects, but only in an incomplete and unrealized state. The abstract component dynamically generates and manages the final form look and feel of the concrete components. Moreover, by representing the interface in abstract terms, the present invention effectively enables the creation of dynamically bound views not possible in the currently known MVC tradition. The architectural framework according to the present invention, defines a declarative based Model-Abstraction-View-Controller user interface architecture.

Figure 6:
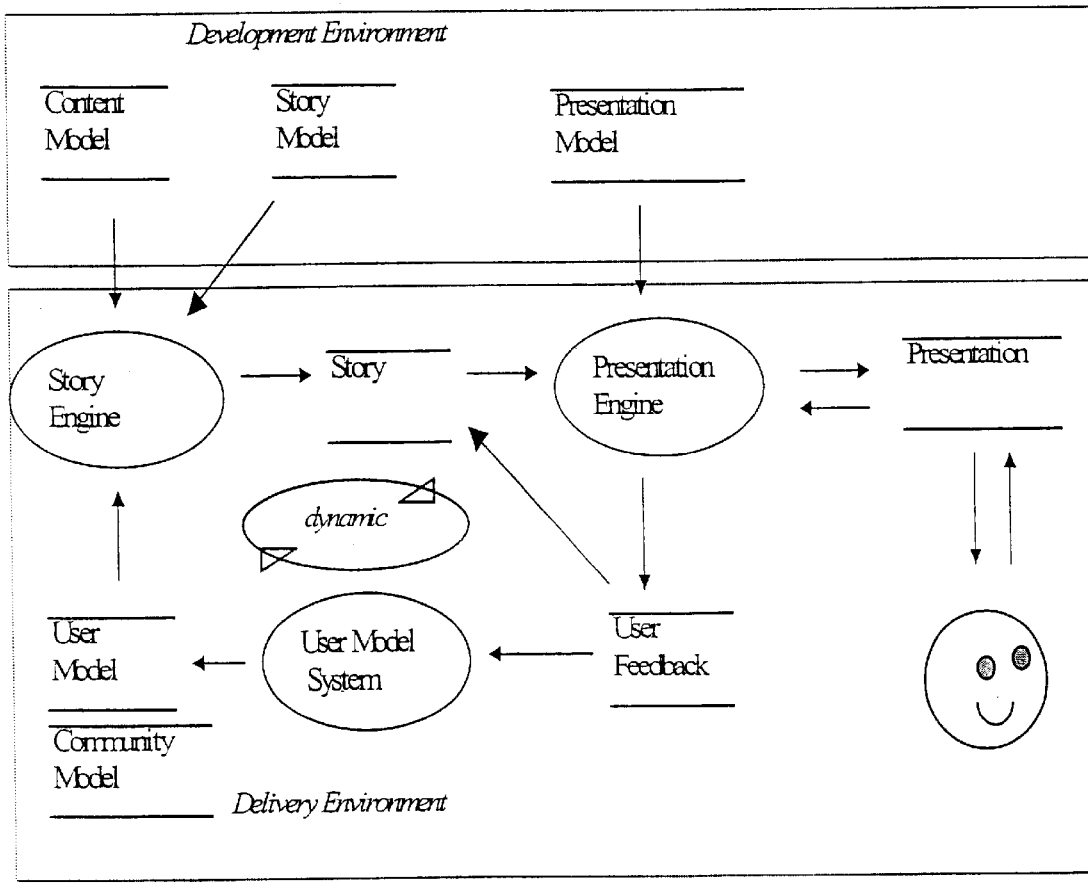
FIG. 6 is a flow diagram showing a functional overview of an application's framework according to the present invention.

FIG. 6 shows a functional overview of an application framework according to the present invention. In FIG. 6, the items in the circles represent subsystems. The items inside the parallel lines generally represent models, except for the user feedback. The process of developing an application using an application framework according to the present invention, consists of designing or specifying (and possibly reusing or repurposing pre-existing models) models required by the agents of the framework. Basically, the models for content presentation and the user need to be created. The designer of the application must design and specify: a content model, a story model (narrative structure), a presentation model, and a domain user model for the user model. Creating a content model is building a typical model of the application, such as called for in the traditional Model-View-Controller sense. The content model is a representation of the semantics that characterize the content elements that make up an application, e.g., a TV program schedule consisting of program line-ups where the line-ups consist of time slots populated by TV programs slated to be broadcast.

The Story Model (narrative structure) is a "protean"-like content model. It serves to organize the content elements that have been selected as candidates for the presentation generation phase. The narrative is basically the universe of possibilities as defined by the semantics of the application, e.g., creating a personalized TV program guide that presents a set of personalized line-ups involves a narrative structure that groups candidate programs according to their start time (candidacy is a complex step of consulting a user model and predicting the best content elements given a set of application specific criteria).

The presentation model specifies the components of a presentation, the behavior (linking actions in the presentation units to application content functions) and design heuristics (rules that guide setting the presentation style, presentation context, and display context), e.g., in the personalized TV program guide, if the presentation context is thematic then generate a personalized line-up where each line-up represents a particular theme given the candidate set. The Presentation Builder stores the presentation model in persistent storage.

Building a domain model for the user model involves accounting for the features that make up the content elements in an application, e.g., using the personalized TV program guide once again, features would include, e.g., program type, level of violence, etc.

Architecture/Subsystems

Figure 7:
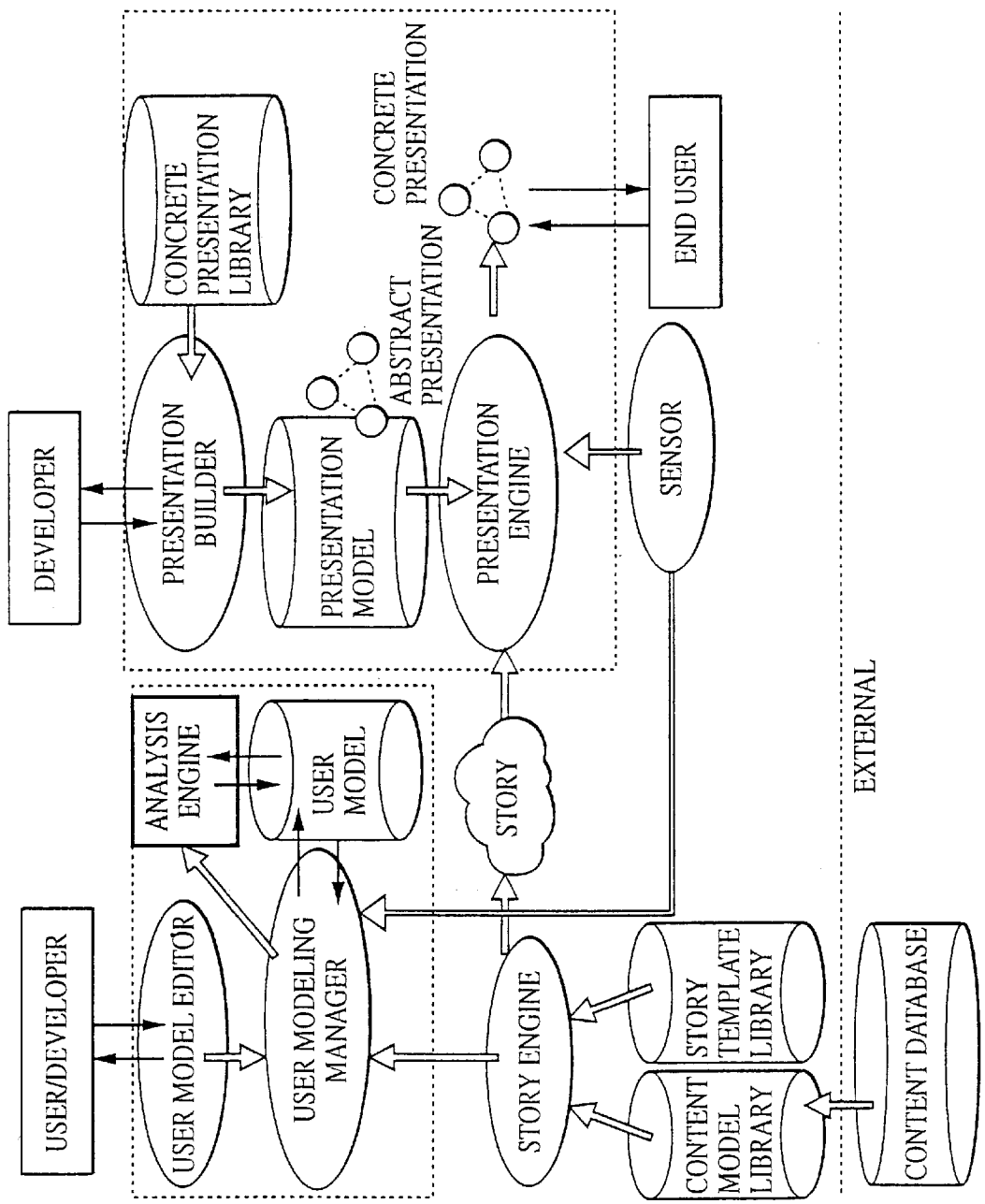
FIG. 7 is a flow diagram showing an architectural framework system architecture according to the present invention.

FIG. 7 shows a flowchart of an exemplary system architecture according to an architectural framework according to the present invention. The User Model Manager manages the storage and retrieval of user's interests and trends and interfaces to other subsystems. The Analysis Engine is used to analyze interaction histories and detect patterns and trends. The User Model Editor is an administrative tool that allows a user and/or administrator to modify a user model. The user modeling subsystem uses user models and community models. A community model is a model of a group of users that share some common interest or trend.

The Story Engine selects application-specific content to serve as the addition for a new presentation, and generates a narrative/story that allows for multiple play out of different presentations of the story. The Story Engine uses the story model and the user model. The Presentation Engine is responsible for interpreting an abstract presentation model and creating concrete presentation objects. The Presentation Engine also resolves constraints imposed by abstract presentations, input content, and display context as part of the final realization of the concrete presentation objects. The Presentation Engine uses the presentation model and the story model. The Presentation Builder is responsible for storing presentation models in persistent form. The Presentation Builder uses the presentation model.

Designing and delivering an application using an architectural framework according to the present invention generally include:

1. The application creates a Story Engine (SE) and a User Model Manager (UMM).
2. The application informs the SE who the user is and any other application-specific information deemed necessary.
3. The SE requests a user model from the UMM.
4. Upon receiving a user model from the UMM, the SE is handed a narrative structure as defined by the application semantics.
5. Applying filters contained in the narrative framework, the SE places the results (i.e., content elements) in the narrative structure.
6. The application creates a Presentation Engine (PE).
7. The PE is handed the narrative structure for the application, the content model, and the appropriate presentation model.
8. The PE generates an abstract presentation as defined by a presentation model.
9. The PE exercises the abstract presentation's heuristics and generates a concrete presentation.
10. The PE displays the concrete presentation.

The application is self-sustaining at this point. The abstract presentation, along with the presentation engine, handle autonomously most interaction scenarios using the flexible and adaptable capabilities encapsulated in the presentation. Two basic scenarios exist that will violate this state. First, the user requests for content data that did not play a role in the story generation (e.g., in the personalized TV program guide, personalized line-ups from 6:00 p.m. to 9:00 p.m. are presented, but the user now wants to expand the window of the program guide by looking at programs from 6:00 p.m. to 12:00 a.m.). In the second scenario, there is a change to the content model and its elements, requiring generation of the story by re-evaluating the narrative and recreating the presentation (e.g., in the personalized TV program guide, a programming change has occurred and a new show has been scheduled). Both of these scenarios involve executing steps 5–8.

At appropriate times (e.g., overnight), the Analysis Engine examines the interaction histories and the user models and recomputes trends and patterns. The user models are then revised accordingly. An architectural framework system according to the present invention is thus self-improving, self-sustaining and virtually perpetual.

Abstract Class Specifications

Figure 8:
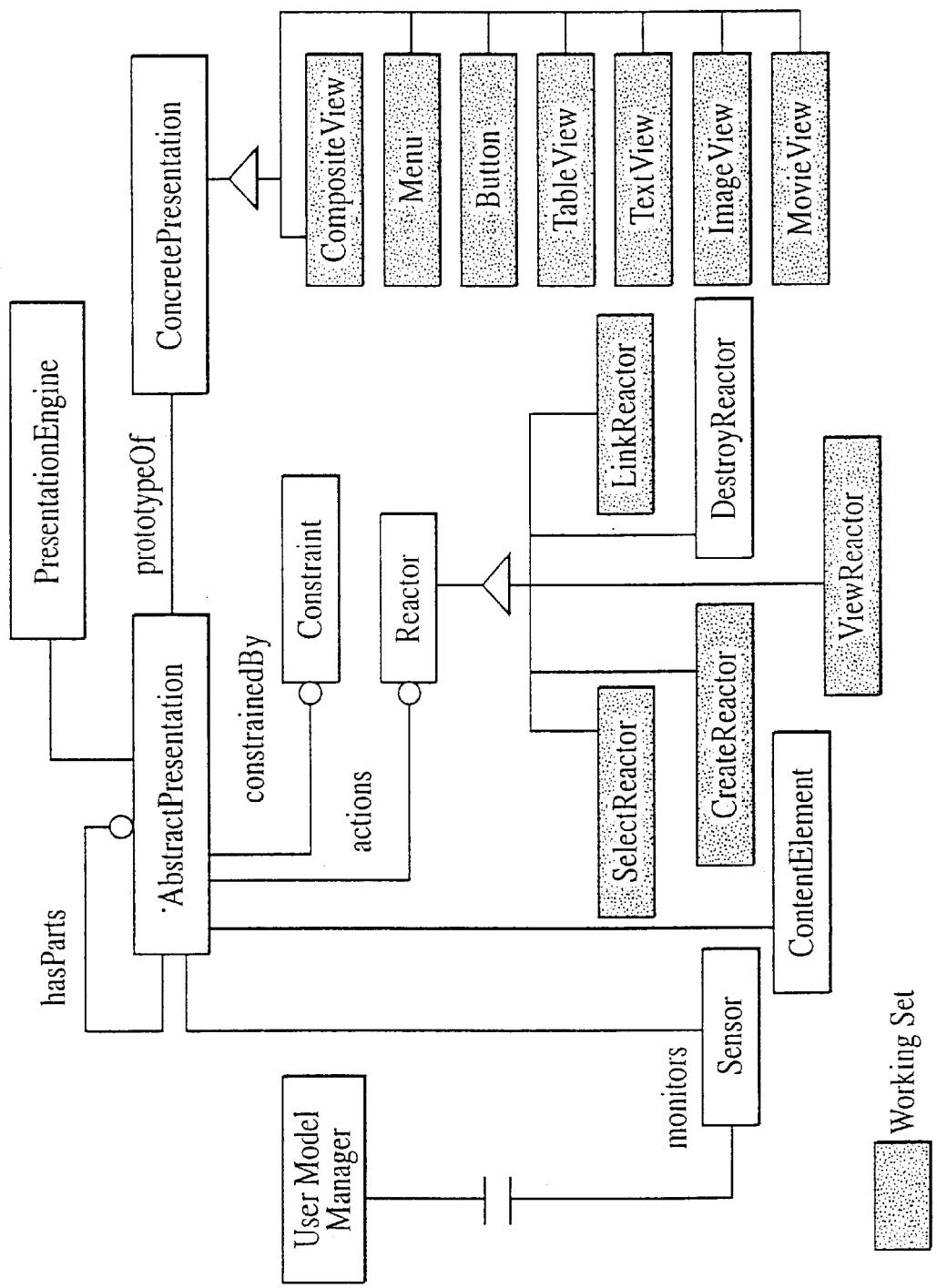
FIG. 8 is a flowchart showing an exemplary presentation object model according to the present invention.
Figure 9:
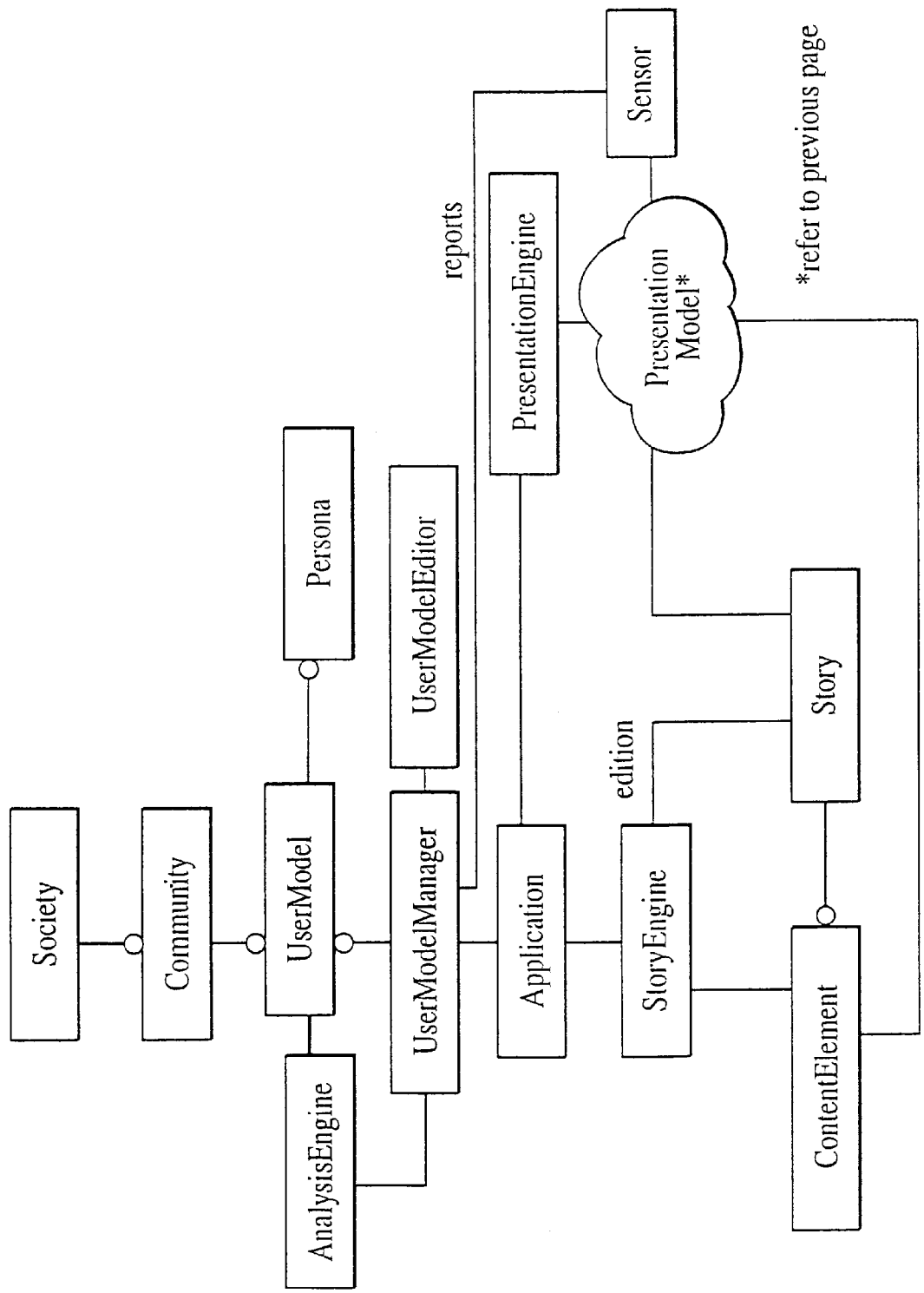
FIG. 9 is a flowchart showing an exemplary object model for framework according to the present invention.

Some exemplary object models for the architectural framework according to the present invention follow. FIG. 8 shows an exemplary presentation object model according to the present invention. FIG. 9 shows an exemplary object model for the architectural framework according to the present invention. The various boxes in the object models represent classes of objects of the architectural framework. The following tables list the classes along with their associated responsibilities and attributes.

| Presentation Classes | |
|---|---|
| Responsibilities | Attributes |
| AbstractPresentation | |
| Serve as prototype for a ConcretePresentation | set of presentations<br>set of reactors |
| Manage a set of subordinate presentations<br>Add a presentation<br>Delete a presentation<br>ConcretePresentation | a ConcretePresentation<br>set of associated constraints (rules) |
| Interface to windowing/GUI environment<br>Sensor | a ConcretePresentation |
| Reports user behavior to UserModel-Manager<br>Monitors for specific events<br>Reactor | an AbstractPresentation<br>an Event Type<br>a UserModelManager |
| Encapsulates an application-specific behavior<br>Acts as an action/command object<br>PresentationEngine | an AbstractPresentation<br>a ContentElement |
| Creates and displays AbstractPresentations<br>Interprets the declarative specification associated with an Abstract-Presentation<br>Reports invalidated presentations to Application<br>Resolves presentation's constraints and realizes ConcretePresentations<br>PresentationBuilder | an AbstractPresentation (top-level)<br>an Application |
| Stores AbstractPresentation in persistent storage (e.g., file) | an AbstractPresentation (top-level) |

| Content Classes | |
|---|---|
| ContentElement | |
| Represents an application-specific object | |

| Story Classes | |
|---|---|
| StoryEngine | |
| Selects ContentElements as specified by Story type and filtered by the UserModel<br>Creates a Story structure<br>Story | a UserModel<br>a ContentElement (top-level)<br>a Story |
| Represents a particular narrative structure, application-specific | set of ContentElements |

| User Modeling Classes | |
|---|---|
| UserModel | |
| Maintain multiple personae<br>Add a persona<br>Remove a persona<br>Find a persona<br>Persona | set of personal data<br>set of Persona |
| Add a situation-action pair<br>Remove situation-action pair<br>Find situation-action pair<br>Community | set of preferences<br>set of situation-action pairs (history) |
| Add UserModel<br>Delete UserModel<br>Construct Average UserModel<br>Find UserModel | set of UserModels |

-continued

Presentation Classes

| Responsibilities | Attributes |
|---|---|
| Society | |
| Add Community | set of Communities |
| Delete Community | |
| Construct Average Community | |
| Find Community | |
| UserModelManager | |
| Gateway to AnalysisEngine, UserModelEditor, and UserModels Requests for Sensor from PresentationEngine | set of Models |
| AnalysisEngine | |
| Performs historical/trend analysis on UserModel's histories | a UserModel |
| UserModelEditor | |
| Presents a UserModel's set of persona | a UserModel |
| Presents a persona | |

Application Classes

| Application | |
|---|---|
| Sequences the "tools" to create a presentation | a PresentationEngine |
| | a UserModelManager |
| Handle application-specific events (e.g., invalidated presentations, special timers) | a StoryEngine |

An exemplary representative application will be defined and used to illustrate the capabilities of the architectural framework according to the present invention. This representative application is a TV program guide. The exemplary TV program guide is a personalized program guide (PPG) that suggests TV programs that may be of interest to the user right along side the traditional program schedule. The following assumptions will be used: (1) the presentation model has been previously specified and declared; (2) the application is always up and running (i.e., 24 hrs a day); and (3) the Analysis Engine has conducted its initial analysis of the viewer's history.

Figure 10:
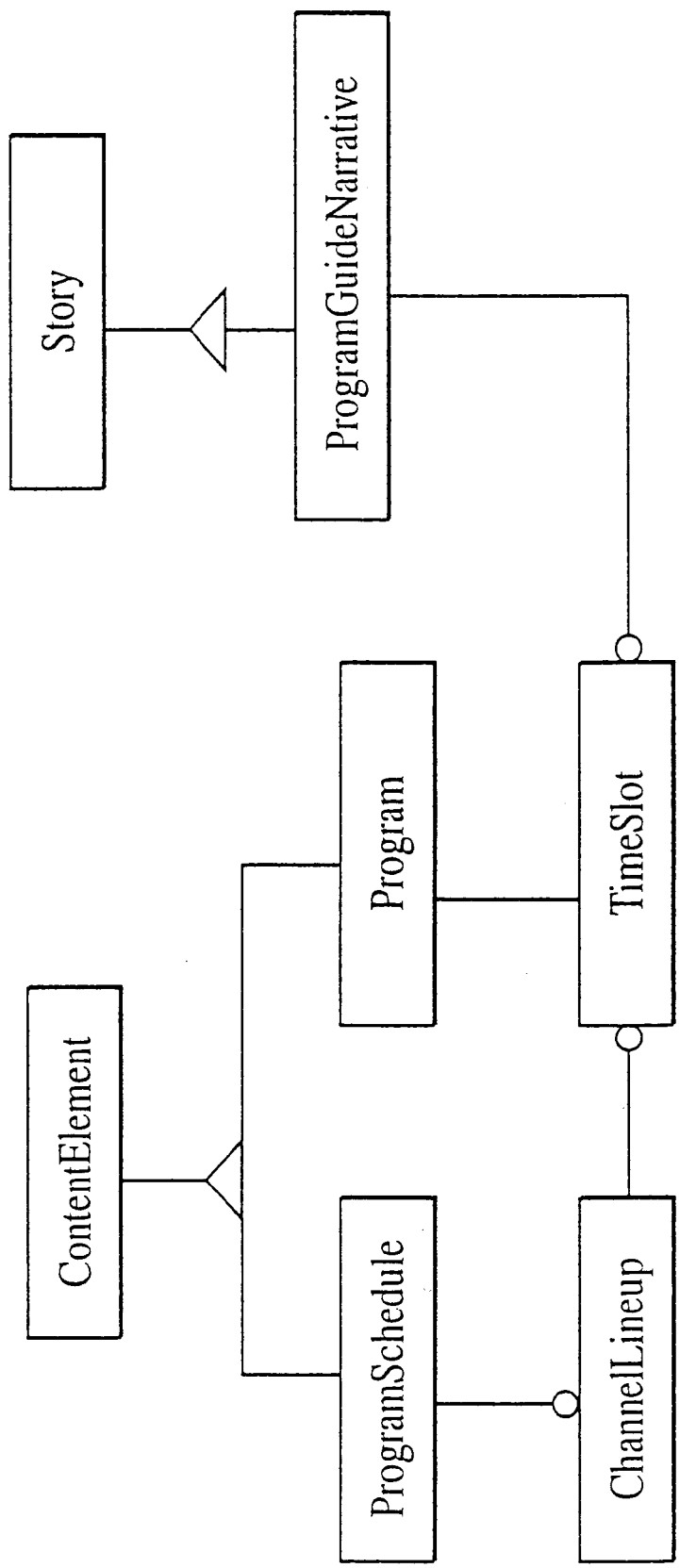
FIG. 10 is a flow diagram of a model of content and story and an exemplary representative application according to the present invention.
Figure 11:
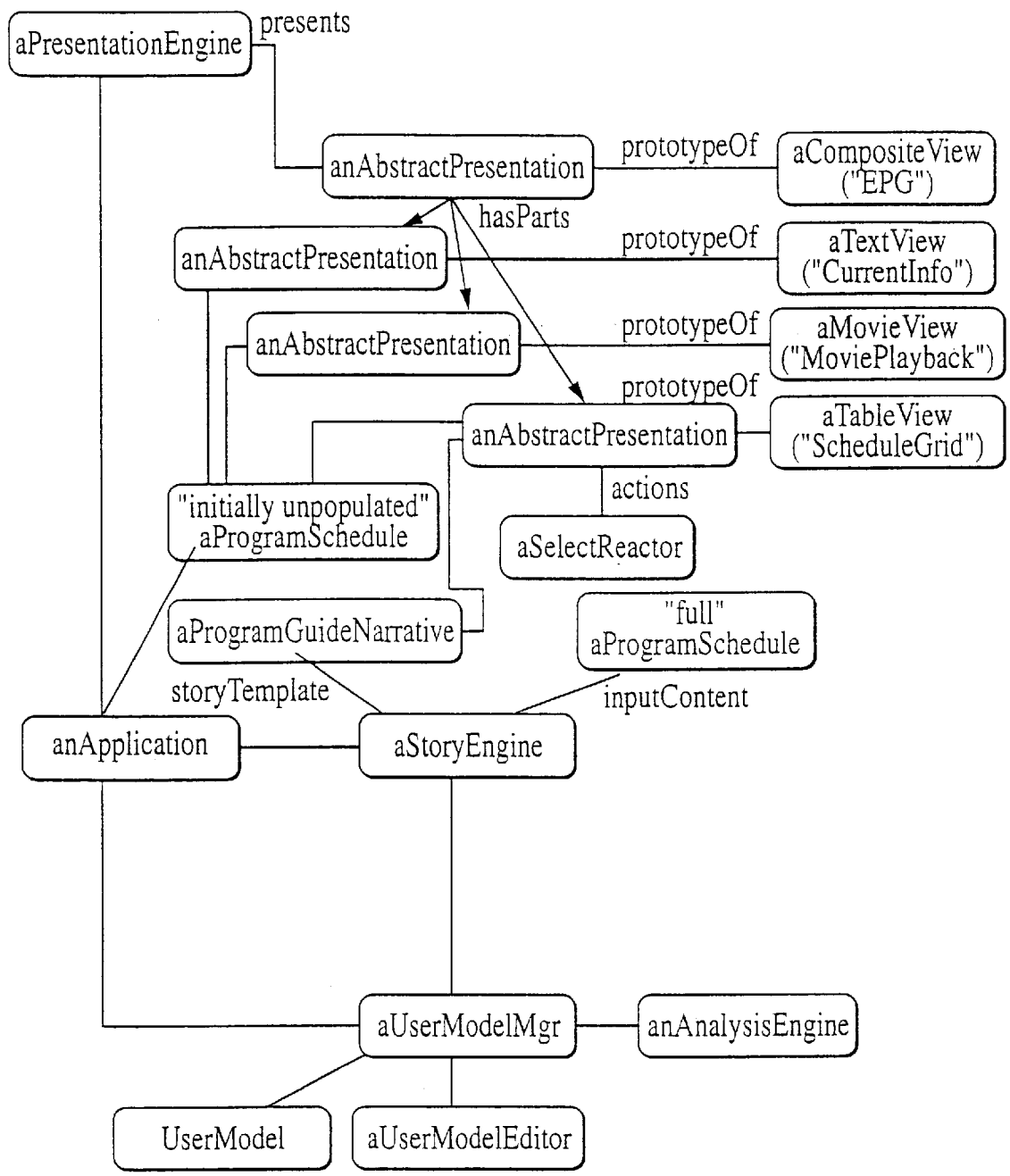
FIG. 11 is a flowchart of an exemplary object model for a representative application according to the present invention.

A content model is defined in order to create the application. FIG. 10 shows an exemplary object model of content and story in the exemplary application. FIG. 11 shows a flowchart for an exemplary object model for the exemplary application. In FIG. 9, the run time representation of the overall exemplary application is outlined. The PPG application displays a program guide that includes three areas: the current movie playback component, a current informational panel, and the program schedule grid.

Figure 12:
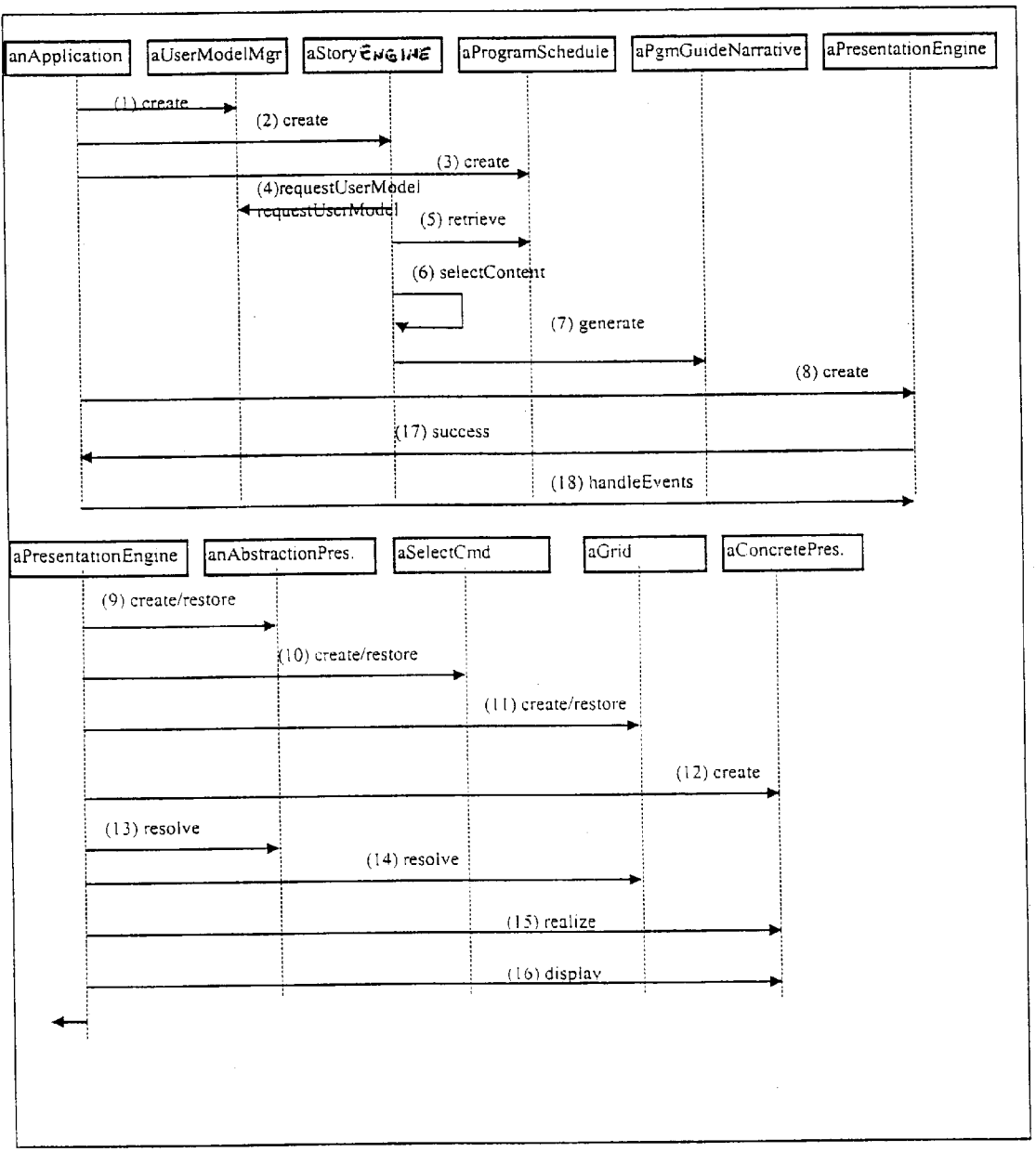
FIG. 12 is an exemplary interaction diagram for bootstrapping use case according to the present invention.

An exemplary case that demonstrates the mechanics and structure of the architectural framework according to the present invention will now be presented. This exemplary case relates to bootstrapping an application from its initial interaction with the user modeling system and the story construction process, to the initial presentation and event handling by the presentation engine. Two assumptions have been made: (1) the presentation model has been previously specified and declared; and (2) the Analysis Engine has conducted its initial analysis of the viewer's history. FIG. 12 shows an exemplary interaction diagram for this exemplary bootstrapping use case according to the architectural framework of the present invention. The following activities occur during this bootstrapping:

(1) anApplication creates a User Model Manager (aUserModelMgr);
(2) anApplication creates a Story Engine (aStoryEngine);
(3) anapplication creates the standard Program Schedule (aProgramSchedule) based on some initial time boundaries;
(4) aStoryEngine requests a user model based on a Name/ID from the User Model Manager (aUserModelMgr);
(5) aStoryEngine retrieves the program schedule (aProgramSchedule);
(6) aStoryEngine selects appropriate application content based on the user model (aUserModel) and the input content (aProgramSchedule);
(7) aStoryEngine generates a story based on a story template program guide narrative (aPgmGuideNarrative);
(8) anApplication creates an instant of a Presentation Engine (aPresentationEngine);
(9) aPresentationEngine creates an abstract presentation (likely a series of nested presentations) by restoring the object from persistent story, e.g., straining from a file;
(10) aPresentationEngine creates all specified interactors for each abstract presentation. In this example, aSelectCmd interactor.
(11) aPresentationEngine creates a grid object to aid in the layout of the overall presentation;
(12) aPresentationEngine creates all concrete presentation objects as declared by their corresponding abstract presentation;
(13) aPresentationEngine resolves constraints as specified by the display rules and application rules and reconciled with the input content and the display context by the aPresentationEngine's constraint solver/rule interpreter;
(14) Selective presentation can occur as a result of the previous step. A grid consistently preserves the overall presentation design;
(15) aPresentationEngine realizes the concrete presentation's (aConcretePresentation) by determining its final form including attributes and settings;
(16) aPresentationEngine displays the concrete presentation (aConcretePresentation);
(17) aPresentationEngine notifies the application (anApplication) of its successful initialization; and
(18) anApplication evokes aPresentationEngine's event handling routine.

Software and Design

Another exemplary embodiment of a service is in the context of the World Wide Web, and more specifically a corporate gateway web site will be used to further describe the architectural framework according to the present invention. A corporate gateway web site may be designed to serve a company's online product and service catalogue, customer service center, or depending on the company's line of business, serve as a content navigator. In this exemplary embodiment, XYZ Communications is a communications company that has set up a web site that includes corporate product and service information and serves as a gateway to aggregated content (e.g., special events, community information, etc.).

The present invention uses a basic structure called a feature-vector that consists of attribute-value pairs, e.g., "keyword=cooking", or "author=Smith", etc. A feature in a feature-vector is represented by a type (e.g., keyword, geo-location, address) where the feature type encapsulates validation routines for authenticating the feature's data. These routines may be utilized by meta tools such as editors to validate the data entered at the interface.

Figure 13:
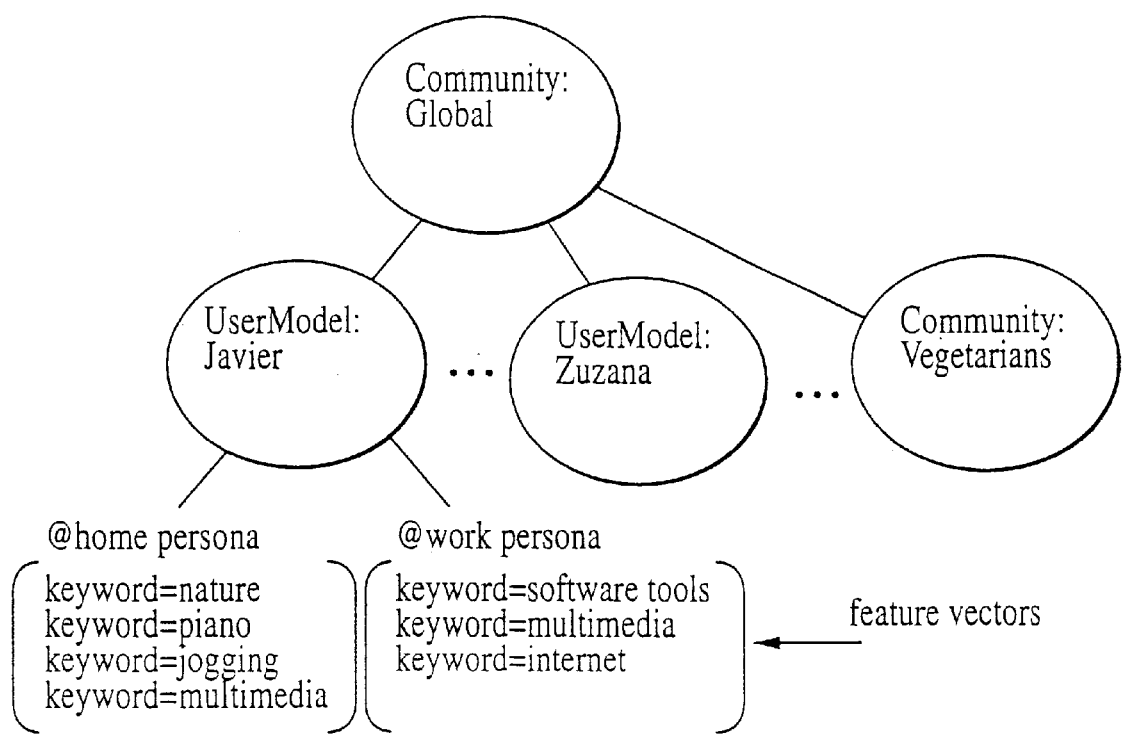
FIG. 13 is a flowchart showing the relationships between a community model, user models, and user personae according to the present invention.

A user model simply contains a feature-vector that is made up of a set of weighted features. The weight designates the relative importance of the feature with respect to a user's apparent interest. A feature and its associated weight may be explicitly or implicitly defined, i.e., manually set by the user, or derived by some statistical or machine learning algorithm analyzing a user's previous interaction history. Community models that represent a set of users may be created by bringing together users for different reasons (location, interest, job, or event). Therefore, a user model may actually represent an aggregate of several user models, each one representing a different persona, e.g., work, home, etc. as shown in FIG. 13.

As previously discussed, a content model is required by a content assembly engine to put together a story tailored to a user's request and profile. This requires a content model to be able to associate the various content elements semantically to form a story and to associate the content with user's preferences. In addition, a presentation generator (i.e., Presentation Engine) needs to provide adaptive content presentation given the delivery context, including the end user device configuration, network bandwidth, etc. The content model should be able to offer alternative presentations of the content for the presentation generator to select from.

Figure 14:
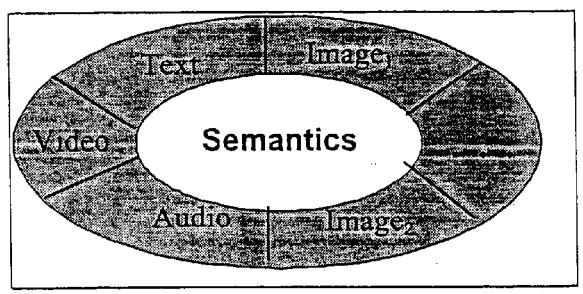
FIG. 14 is a diagram showing semantics and content.
Figure 15:
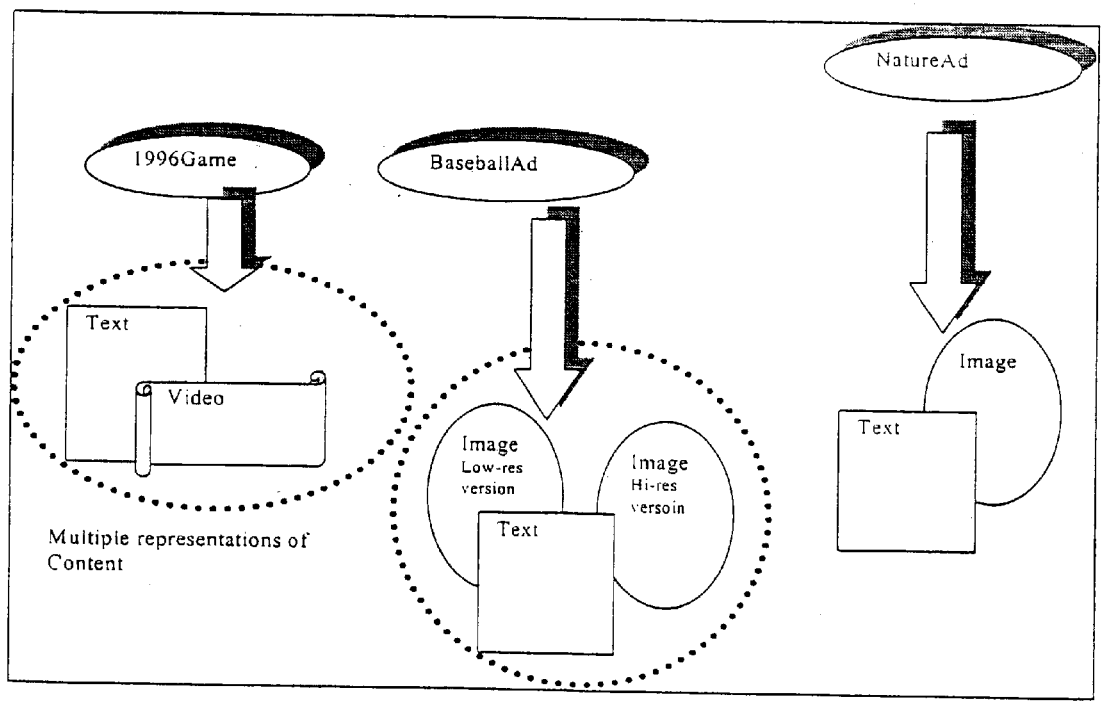
FIG. 15 is a flow diagram showing multiple representations of content according to the present invention.

In the architectural framework according to the present invention, a content element is defined as an object representing a piece of information that can be presented via one or more media types. FIG. 14 shows a diagram of semantics and content where the semantics describe what a content element is about. The semantics could potentially enable a content assembly engine to associate content elements on a more semantic level. An event or item on our exemplary web site could be represented as a content element that is media independent, but can manifest itself in multiple forms or representations such as a text document, an audio/video clip, or even a multimedia presentation. For example, assuming our exemplary web site included events such as information regarding a 1996 game, a baseball ad, and nature ad, FIG. 15 displays how each of these events could have multiple representations of content.

The application framework according to the present invention uses dynamic content assembly. With this approach, the development of an application or service is similar to the process of creating a dynamic story or movie that can adapt to a user, the available content, and the context at the time of delivery. The present invention uses, among other concepts, three basic concepts in support of dynamic content assembly: story, filter, and scene.

Figure 16:
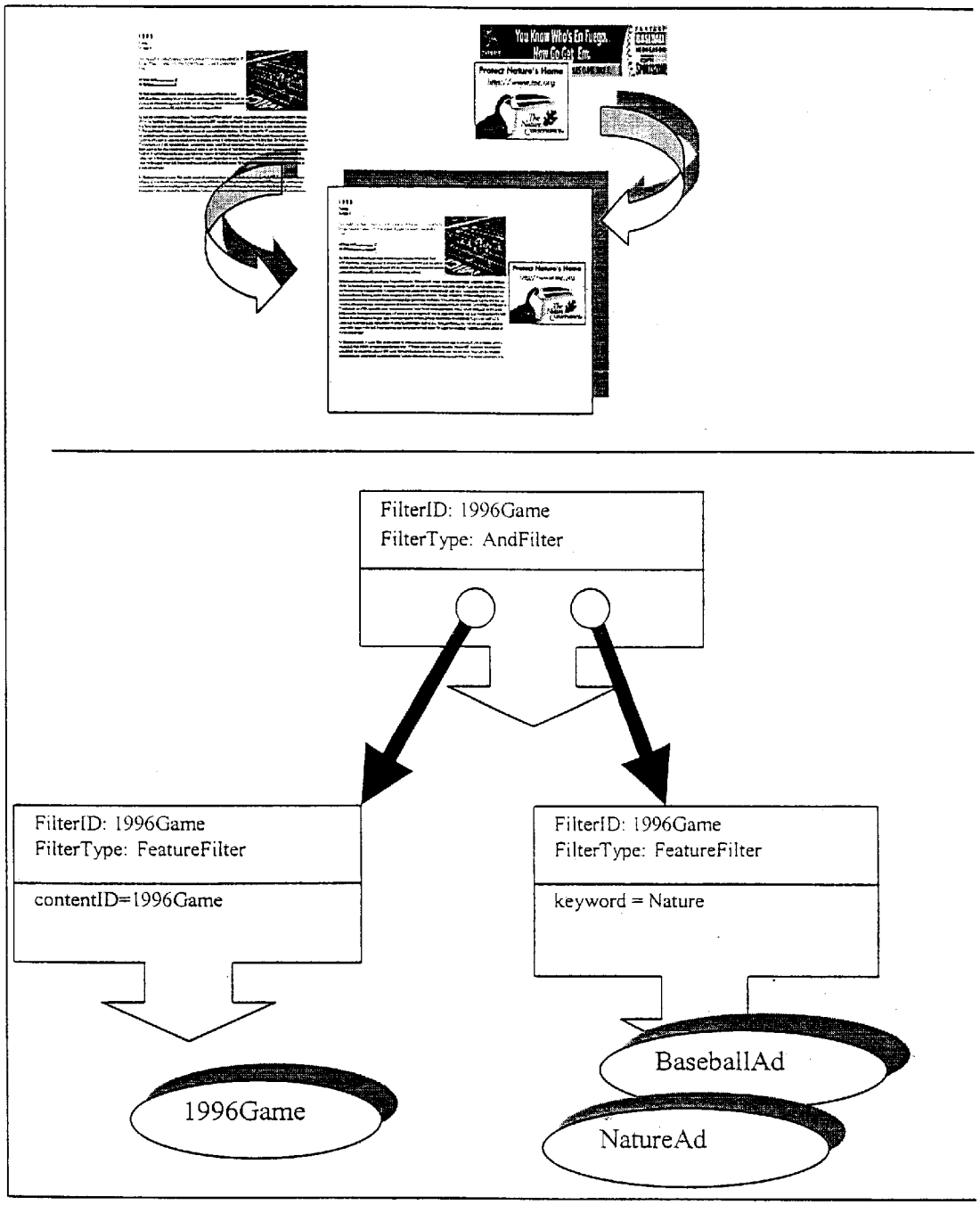
FIG. 16 is a diagram showing selective assembly of content according to the present invention.

A filter is a construct that takes in a set of content elements and returns a subset of the original inputs. A filter has specific filtering semantics, e.g., a feature-based filter that uses a feature (e.g., "keyword=television") to comb through an input set of content elements to retrieve content elements that match the feature. FIG. 16 shows an example of two such filters and the results being joined by an Andfilter that "ands" the results of two other filters. In this example, we have selected two content elements, one selected explicitly by a content ID and the other by filtering for advertisements that have been characterized to be related to nature.

By chaining filters, complex filtering patterns can be produced. A composite filter enables the creation of hierarchical layered reusable content assembly. A scene is a composite filter that basically corresponds to one element and a story. By assembling a series of modular, layered scenes, we can tell a story at a fine level of granularity tuned to the user and the delivery context.

The architectural framework according to the present invention uses adaptive presentation in that scenes are presented in different ways depending on the available context of delivery (such as available display real estate, the network connection, etc.). To support adaptive presentation, a presentation engine may generate presentations that take into account the context of delivery and select appropriate media representations to show the content element. In the present invention a template, that acts as a proxy for a story element or scene element, is used regarding laying out and arranging the presentation elements. A primitive template has the responsibility of selecting the appropriate media element. A composite template serves to support the design of hierarchal presentations with a fine level of specification and control. By implementing these concepts and objects, the present invention supports the creation of custom presentation components that are refinements of the basic presentation classes that can render a scene to a user in the most appropriate form. In the present invention, presentation components have the ability to render a scene without having to change the story.

Application Subsystems

Figure 17:
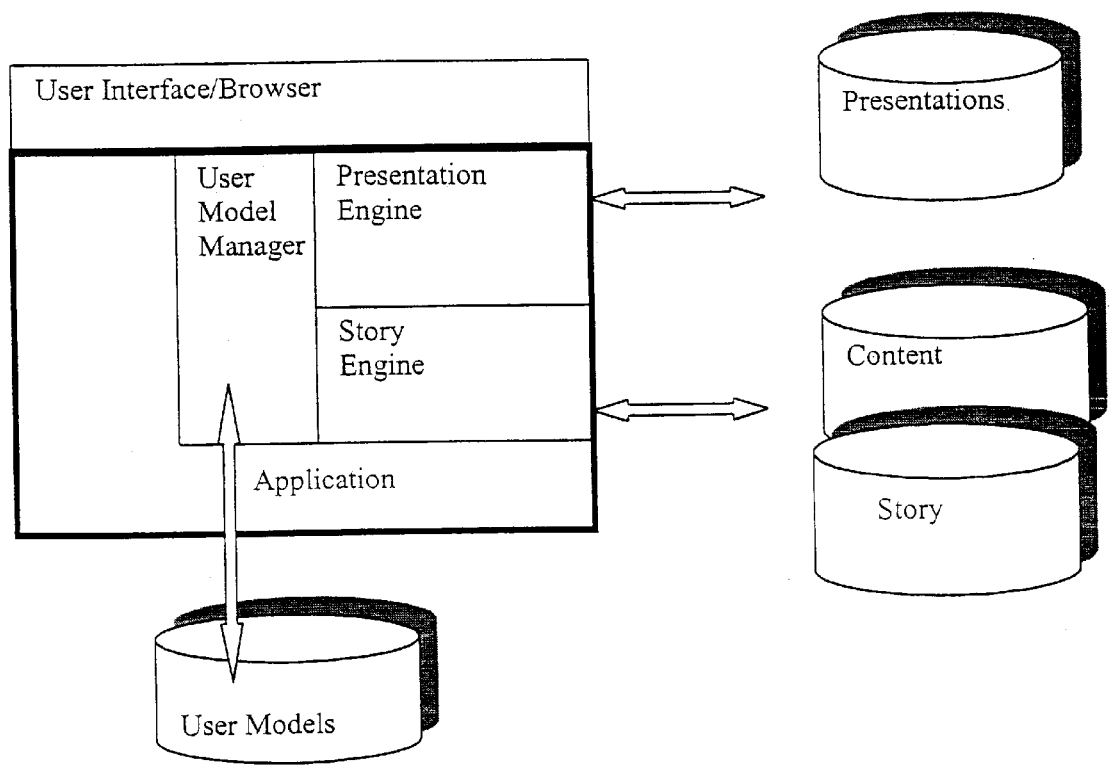
FIG. 17 is a diagram showing an anatomy of an application according to the present invention.

Creating an application in accordance with the present invention involves interfacing to each subsystem's public interface. Each subsystem's public interface is encapsulated in the public operations of a select set of objects within each subsystem. An application is basically the glue that brings together invocations to the public interfaces of the subsystems as well as to any other external subsystems, e.g., databases. FIG. 17 shows a diagram of an anatomy of an application using the architectural framework according to the present invention. Further, the following pseudo-code describes the basic framework of an application according to the present invention:

```
Application:
    main( )
        umMgr=new UserModelManager
        storyEngine=new StoryEngine(umMgr);
        storyEngine.init( );
        presentationEngine=new PresentationEngine(umMgr);
        presentationEngine.intit( )
        current_scene=StartScene
        While Until exit( )
            StoryEngine.assemble(current_scene)
            storyEvent=PresentationEngine.present(current_
                scene)
            current_scene=StoryEngine.dispatchEvent
                (storyEvent)
        end while
    end main
```

In summary, an application proceeds through the following steps:

(1) Creating and initializing a UserModelManager;

(2) Creating and initializing a story engine;

(3) Creating and initializing a PresentationEngine;

(4) Selecting a story element (i.e., scene) to be the initial element of the story;

(5) Calling upon the StoryEngine to assemble a "story" given the initial element;

(6) Upon the StoryEngine completing its assembly task, calling upon the PresentationEngine to present the "story";

(7) Dispatching a story-relevant event to the StoryEngine to determine the next story element (scene) to play;

(8) Based on the outcome of the event, set the next story element (scene) to be assembled and subsequently presented.

Referring to our exemplary web site example, the initial story element is set to an element representing the home page of XYZ Communications' web site. As the story plays out with user interaction, the system proceeds through its assemble-present-dispatch steps, a kind of dynamically generated contextual movie. Therefore, a user could rapidly end up, for example, on one page of the XYZ Communications web site because a user has shown a continuing interest in the subject matter of that page. This interest was detected because the user has had a tendency to select information that can be described to have some sort of connection with that subject matter. For example, if the web page was a vegetarian page, the user may have shown interest in eating healthier, therefore, a connection with healthy diets. The end result is that the user would not have to wade through an extensive set of links and/or pages on topics of no or little interest to him or her.

Regarding the interface, in this example, the user is interacting with a user interface or a browser, depending on the implementation environment. Additionally, the Story Engine and the Presentation Engine serve as single points of interface to the story and presentation databases respectively. The User Model Manager takes on a similar role over the database of user models by being a gateway to any user information.

System Partitioning

Typically, an application is not just resident on one processing element but is distributed or networked, i.e., distributed and partitioned in multiple elements. The following shows embodiments of an application developed with the architectural framework according to the present invention where the application is partitioned across network elements.

Figure 18:
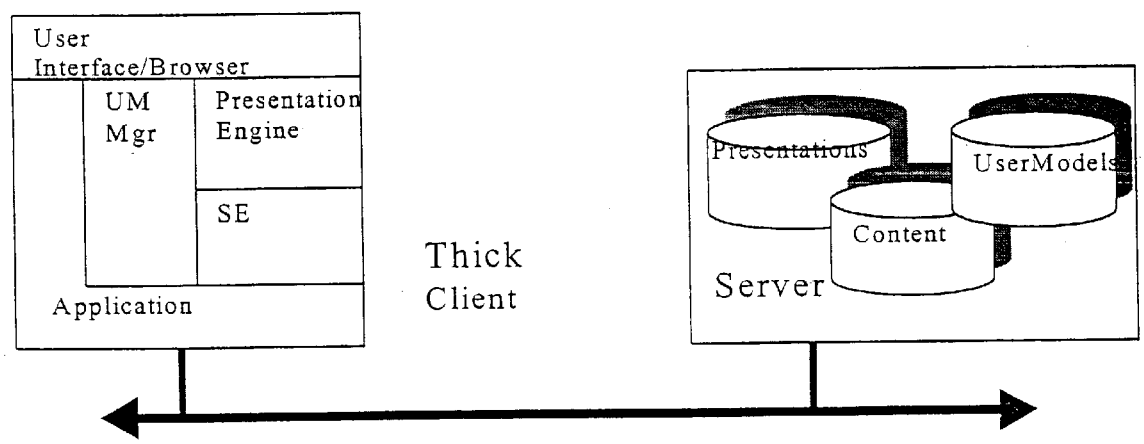
FIG. 18 is a diagram showing a thick client-thin server partitioning of an application according to the present invention.

FIG. 18 shows a network diagram of an exemplary thick client-thin server design embodiment according to the present invention. The client is bundled with both runtime engines (i.e., Story Engine, Presentation Engine) and the User Model Manager that interfaces to a database of user models. The story, content, and presentation databases are remotely based. This requires the Story Engine and the Presentation Engine to be designed to hide the details of accessing remote databases, similar to the role of the User Model Manager, which serves as a gateway to a repository of user models, local or remote. Moreover, the remote databases need to be managed by server processes that can serve multiple remote users and provide an interface to clients for remote object communication (i.e., sockets, Java's RMI (Remote Method Invocation), CORBA (Common Object Request Broker Architecture), etc.).

From the access perspective, this particular design requires the client to be either: resident on the client's machine, or downloaded at the point of remote access, e.g., Java applet.

Figure 19:
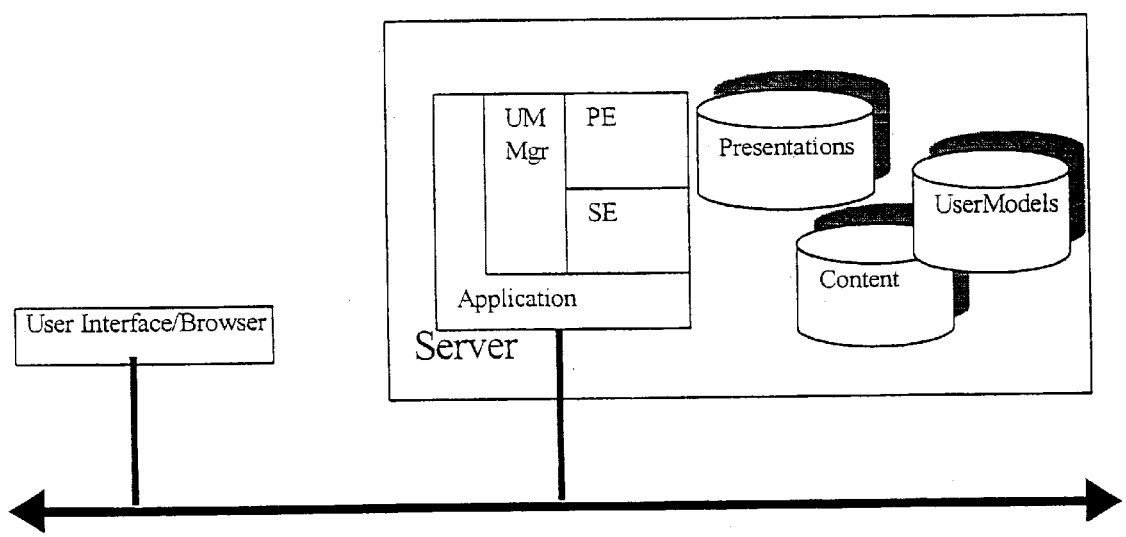
FIG. 19 is a diagram showing a thin client-thick server partitioning of an application according to the present invention.

FIG. 19 shows a network diagram of an exemplary thin client-thick server design embodiment according to the present invention. With a thin client, the majority of the application resides on the server side. Whether the complete application resides on the server or not depends on the implementation of the user interface and the choice of delivery environment. Regardless, the interface needs to have the capability to access and operate the application by sending a request to the remote host, who in effect acts as an application server and returns a generated presentation of the application. For example, if the application resided on the web server, a browser could serve as the user interface allowing the user to request a page for presentation (shipping along some form of identification, cookie, embedded CGI argument, etc.). The server would then assemble and generate a complete presentation and return HTML that would be rendered in the browser.

In terms of access, the interface may be a generic interface like an HTML browser which only acts as an access point and waits for a complete server-side generated presentation to be rendered in its native HTML. Alternatively, in a web environment once again, a Java applet that only implements a custom user interface may be downloaded. The applet would need to interface to the application server via some sort of protocol so it could render a server-side generated presentation utilizing its native Java widgets.

Figure 20:
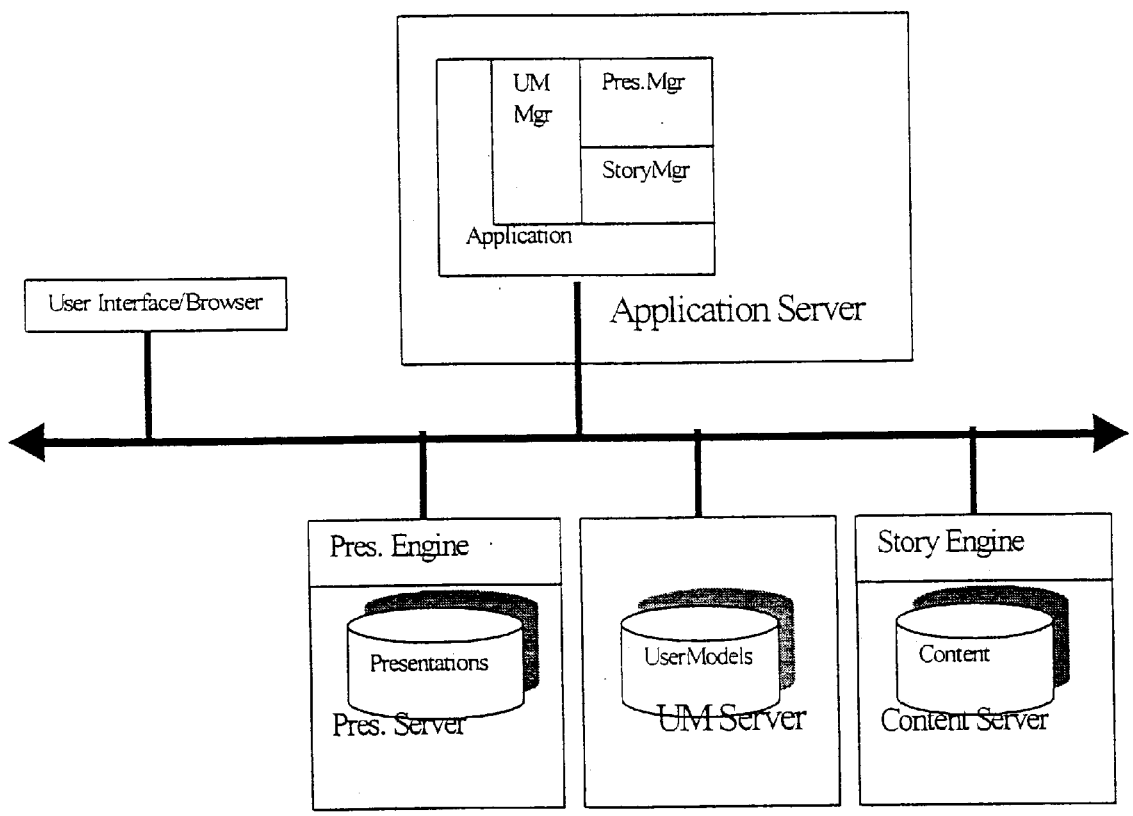
FIG. 20 is a diagram showing a peer-to-peer distributed partitioning of an application according to the present invention.

FIG. 20 shows a network diagram of an exemplary peer-to-peer distributed system. Ideally, all components may be distributed across the network in principle. For a variety of reasons, i.e., load balancing, low bandwidth, intermittent network connections, efficient resource utilization, etc., situations could arise that may warrant configuring an application in a fully distributed architecture (e.g., CORBA, Java RMI). This partitioning implies that the application may be reduced to interfacing to proxy clients that do the real work of talking to their respective components. In a truly distributed system a component may potentially take on both roles of server and client. Regarding access, in this configuration, the point of access is dependent on the implementation and/or delivery environment.

Object-oriented Base Framework Design

The following are descriptions of exemplary class diagrams and base classes that may be used in an applications framework according to the present invention.

User Modeling Subsystem Classes

Figure 21:
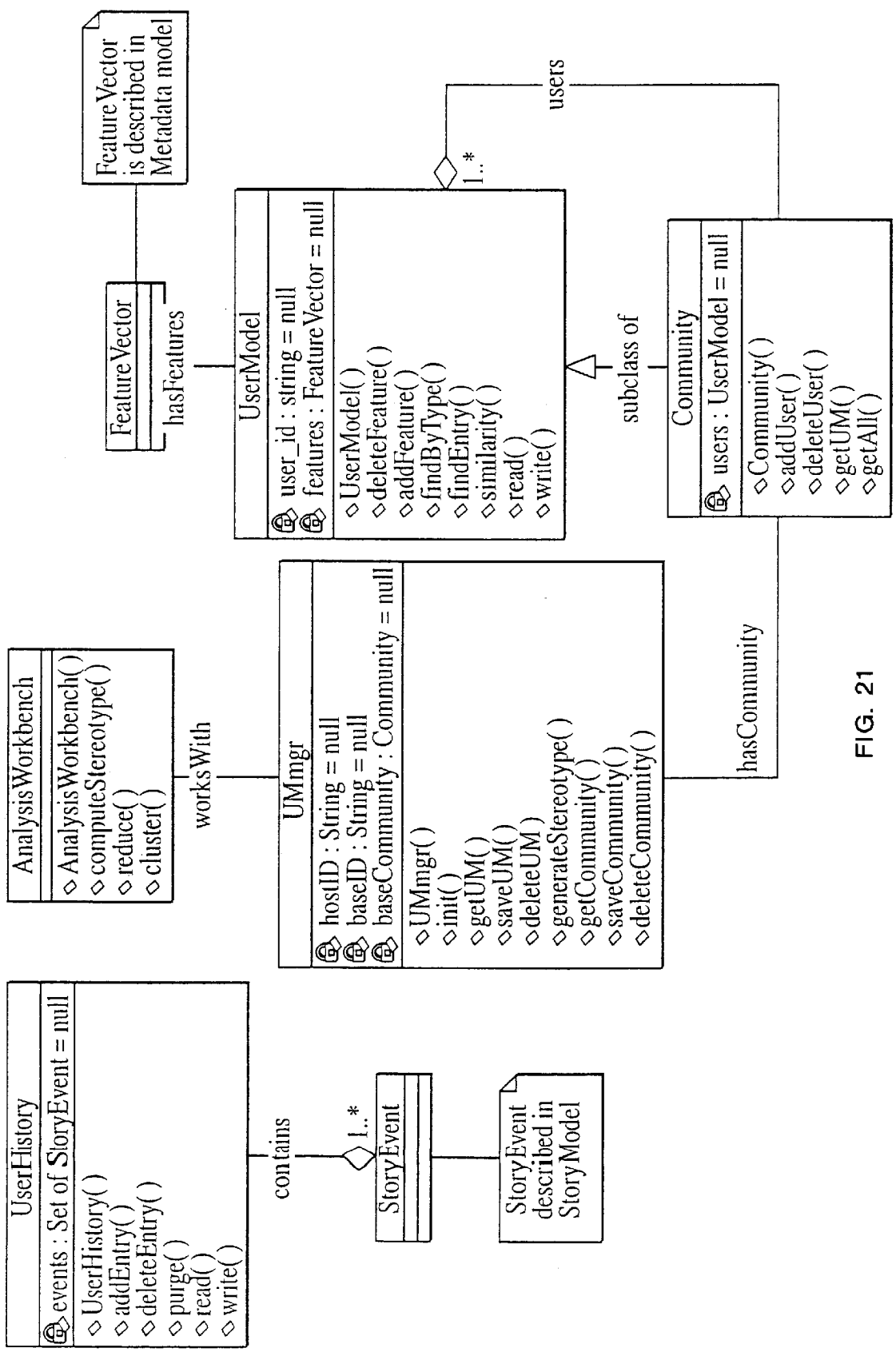
FIG. 21 is a user modeling class diagram according to the present invention.

FIG. 21 shows an exemplary user modeling class diagram according to the present invention. The following provide descriptions of exemplary base classes shown in FIG. 21. The user modeling subsystem may be a collection of classes that supports the creation and maintenance of user models (i.e., profiles).

UserModel
  Description:
    This class represents a user's interests through a FeatureVector. Features are a content-independent metadata structure that serves as a common denominator between users and content.
  Responsibilities:
  Persistent representation of user interests.
  Private Properties:
  user_id: string=null
    A string name for a UserModel.
  features: FeatureVector=null
    A set of features representing a user's weighted interests. A common denominator between UserModels and ContentElements.
Public Methods:
  UserModel (uid: String=null):
    Public constructor parameterized for a string-based user ID.
  deleteFeature (feat: Feature=null): void
    Delete a Feature from UserModel's FeatureVector.

addFeature (feat: Feature=null): void
   Add a Feature to the UserModel's FeatureVector
findByType (sname: String=null): FeatureVector
   Find all Features present in the UserModel's FeatureVector of the indicated type (i.e., typename) and return the results in a new FeatureVector.
findEntry (feat: Feature=null): Feature
   Find supplied Feature in the UserModel's FeatureVector.
similarity (features: FeatureVector=null): float
   Compute a numerical score indicating the degree of similarity between a UserModel (its FeatureVector) and the supplied FeatureVector.
read (istream: InputStream=null): void
   Read a UserModel from a InputStream (language-specific).
write (ostream: OutputStream=null): void
   Write a UserModel to a OutputStream (language-specific).

Community
  Description:
  This class represents a set of users as a community. The inherited FeatureVector from the UserModel base class is treated as stereotype user of the community and computed by the Community class.
   Communities can be created explicitly or implicitly.
  Responsibilities:
  Maintain a set of users.
  Maintain a stereotype of the user.
  Derived from UserModel
  Private Properties:
  users: UserModel=null
   A set of users, i.e., UserModels.
Public Methods:
  Community (id: String=null):
   Public constructor parameterized for a string name.
  addUser (user: UserModel=default): void
   Add UserModel to set of UserModels.
  deleteUser (user: UserModel=null): void
   Delete UserModel from set of UserModels.
  getUM (uid: String=null, umMgr: UMMgr=null): void
   Retrieve a UserModel through the UMmgr and cache the UserModel in the Community.
  getAll (umMgr: UMMgr=null):
   Retrieve all contained UserModels through a UMMgr and cache them in users.

UMmgr
  Description:
  This class serves as interface to all UserModels and Communities. It hides all remote access to remote models.
  Responsibilities:
  Maintain a global set of user models.
  Access point to a all user models.
  Private Properties:
  hostID: String=null
   String ID for remote or local host system.
  baseID: String=null
   String ID for root community (global community that contains all models).
  baseCommunity: Community=null
   The root Community for all models.
Public Methods:
  UMmgr (hostid: String=null, baseid: String=null):
   Public constructor parameterized for string ID for the remote host home to the UserModels, and string ID for the root Community.
  init( ): void
   Initializes the UMmgr's internal data.
  getUM (uid: String=null): UserModel
   Retrieve a UserModel, transparently from a remote or local host system.
  saveUM (um: UserModel=null): void
   Save the UserModel transparently to a remote or local host.
  deleteUM (um: UserModel=null): void
   Delete UserModel from the pool of UserModels at a remote or local host.
  generateStereotype (cm: Community=null): UserModel
   Based on a set of UserModels, generate a UserModel that typifies a user in the given Community.
  getcommunity (uid: String=null): Community
   Retrieve a Community model, transparently from a remote or local host system.
  saveCommunity (cm: Community=null): void
   Save the Community model transparently to a remote or local host.
  deleteCommunity (cm: Community=null): void
   Delete Community model from the pool of UserModels at a remote or local host.

UserHistory
  Description:
  This class represents a repository of a chronically-ordered set of StoryEvents as a result of user interaction.
  Responsibilities:
  Maintain a set of StoryEvents.
  Private Properties:
  events: Set of StoryEvent=null
   the set of StoryEvents that have occurred as a result of a specific user's interaction.
Public Methods:
  UserHistory (uid: UserModel null):
   Public constructor parameterized for a string name indicating the ID of the UserModel.
  addEntry (event: StoryEvent=null): void
   Add an entry, i.e., StoryEvent, to the history.
  deleteEntry (event: StoryEvent=null): void
   Delete StoryEvent from the history of events.
  purge (purgeDate: Date=null): void
   Remove all StoryEvents from the history that occurred before the indicated date.
  read (istream: InputStream=null): void
   Read UserHistory from a InputStream (language-specific).
  write (ostream: InputStream=null): void
   Write a UserHistory to a OutputStream (language-specific).

AnalysisWorkbench
  Description:
  This class brings together an array of analysis tools to update and better target UserModels and extract communities of interest.
  This component is basically a learning system.
  Responsibilities:
  Update UserModels based on their UserHistories
  Compute stereotypical users for Community models.
  Compute correlations between features in UserModels
  Compute clusters of users to discover implicit communities of interest.

Public Methods:
AnalysisWorkbench( ):
Public constructor.
computeStereotype (cm: Community=null): FeatureVector
Compute stereotypical user, i.e., a FeatureVector, for a given Community.
reduce (history: UserHistory=null): FeatureVector
Reduce a UserHistory to a FeatureVector.
A UserHistory contains StoryEvents where some in turn carry information as a result of the user selecting a ContentElement.
This information serves as raw data to determine the effectiveness/relevance of a UserModel's features
cluster (users: Community=null): Community
Apply cluster analysis to a Community of users and generate a Community of Communities, each representing a cluster.

Story Engine Subsystem Classes

Figure 22:
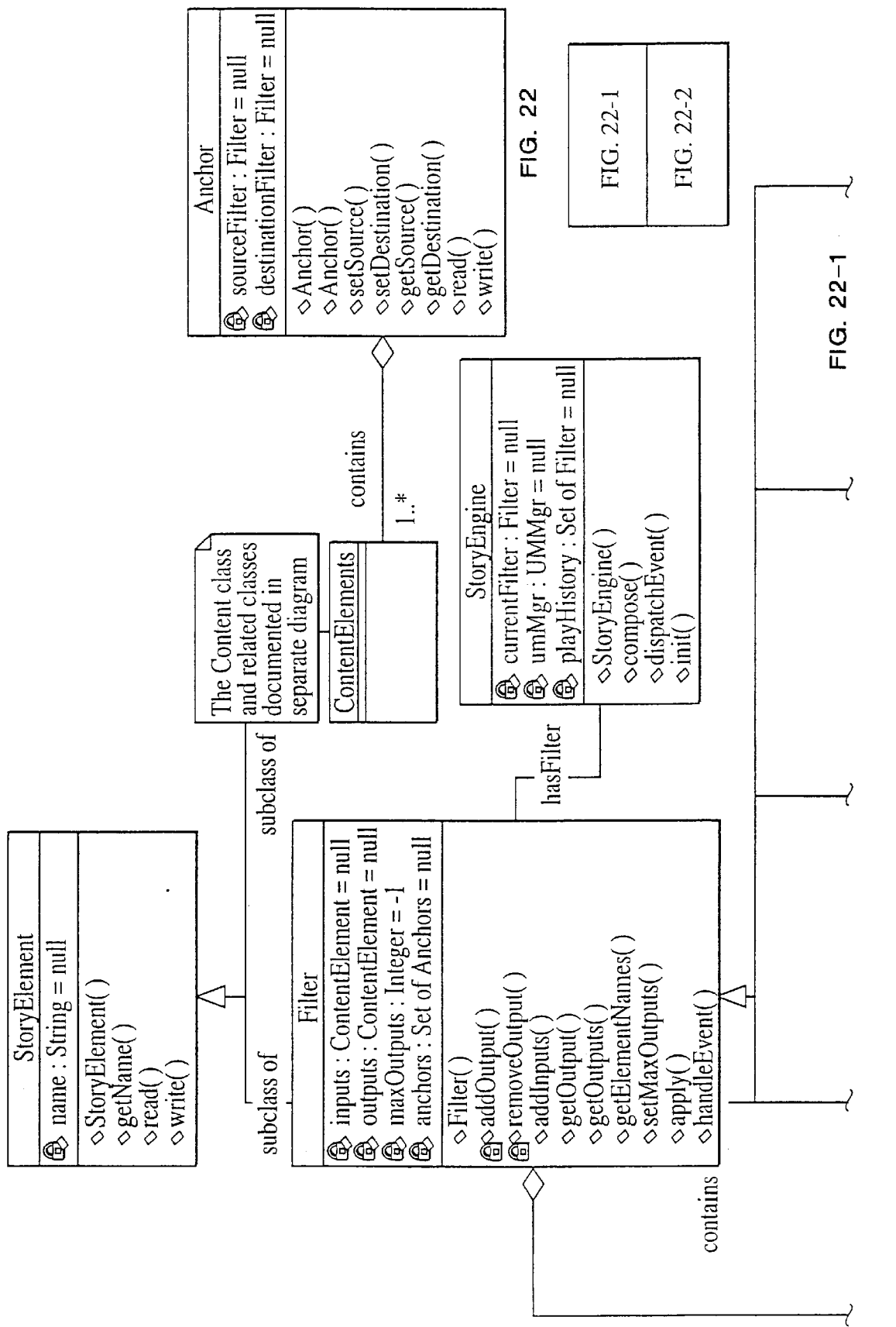
FIG. 22 (consisting of FIGS. 22-1 and 22-2) is a story engine class diagram according to the present invention.
Figures 2, 22:
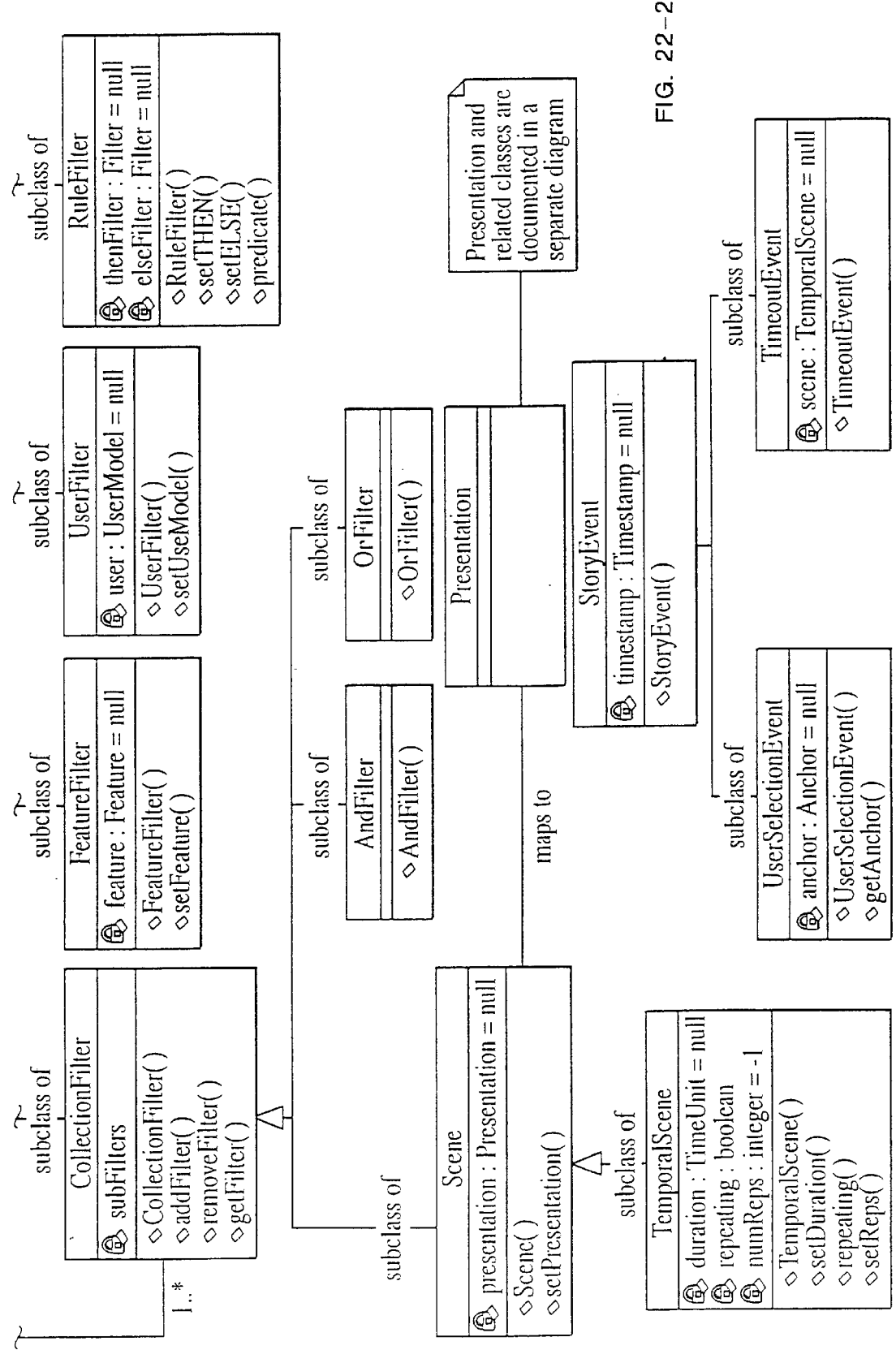

FIG. 22 shows an exemplary StoryEngine class diagram according to the present invention. The following provide descriptions of exemplary base classes shown in FIG. 22. The Story Engine may consist of a content assembler (the Story Engine itself) and the databases containing data structures that specify an application and the underlying content model that represents and interfaces to multiple representations of multimedia content elements.

StoryElement
Description:
StoryElement is the abstract class for all components that makeup a story, i.e., elements to be assembled dynamically.
Responsibilities:
Abstract base class with an associated string ID.
Private Properties:
name: String=null
The name of the StoryElement.
Public Methods:
StoryElement (sname: String=null):
Public Constructor for Story Element.
getName( ): String
Return the name of StoryElement.
read (istream: InputStream=null): void
Read a StoryElement from a InputStream (language-specific).
write (ostream: OutputStream=null): void
Write a StoryElement to OutputStream (language-specific).

Filter
Description:
A Filter is a StoryElement that basically takes a set of input ContentElements and outputs a subset of the ContentElements based on the Filter's filtering semantics.
Each ContentElement that ends up in the Filter's set of outputs potentially has a set of points of interaction called anchors. These anchors can be activated as a result of, e.g., of user interaction, and produce an application event called a user selection. So, a Filter's anchors are derived from its contained ContentElements' anchors.
Responsibilities:
Filter a input set of ContentElements based some filtering semantics (as defined by concrete subclasses).
Handle StoryEvent dispatched from the StoryEngine.
Derived from StoryElement
Private Properties:
inputs: ContentElement=null
The set of ContentElements passed into the Filter for evaluation.
The set can be a selective set as bound by the application or the global set, which is all existing ContentElements in the current database.
outputs: ContentElement=null
The set of ContentElements resulting from evaluating the Filter.
maxOutputs: Integer=−1
Indicates the maximum number of ContentElements stored in the outputs upon evaluating the Filter.
anchors: Set of Anchors=null
The set of anchors associated with the ContentElements enumerated in the outputs.
Public Methods:
Filter (sname: String=null):
Public constructor for Filter parameterized for the string name.
addInput (iElement: ContentElement=null):
Add a ContentElement to the set of inputs.
addinputs (iElements: Set of ContentElement=default): void
Add a set of inputs to the set of inputs.
getoutput (i: int=0): ContentElement
Retrieve the ith ContentElement from the set of outputs.
getOutputs( ): Set of ContentElements
Retrieve the Filter's complete set of Outputs.
getElementNames( ): Set of String[ ]
Get an array of ContentElement names.
setMaxOutputs (max: Integer=−1): void
Set the maximum of ContentElements cached in the outputs.
apply( ): boolean
Apply the Filter's filtering semantics and place results in the outputs.
handleEvent (event: StoryEvent null): boolean
This operations handles any Application-level event that has been dispatched by the StoryEngine.
Private Methods:
addoutput (ce: ContentElement=null): void
Internal operation for adding a ContentElement to the set of the outputs.
removeOutput (element: ContentElement null): void
Internal operation for removing a ContentElement from the set of outputs.

CollectionFilter
Description:
This type of Filter serves as the base class for all collection-oriented filters. Specialized classes of CollectionFilter define specific filtering semantics.
Responsibilities:
Operate over a set of contained Filters.
Derived from Filter
Private Properties:
subFilters
The collection of contained Filters.
Public Methods:
CollectionFilter (sname: String=null)
Public constructor parameterized for string name.
addFilter (filter: Filter=null): void
Add a Filter to the collection of Filters, i.e., subFilters.
removeFilter (filter: Filter=null): void
Remove a Filter from collection of Filters, i.e., subFilters.

getFilter (i: integer=−1): Filter
  Get the ith filter in the subFilter set.
FeatureFilter
  Description:
    This class is a Filter whose filtering semantics is to filter the input set of ContentElements based on the supplied Feature. The resulting set of matches is stored in the outputs. The maximum number of matches is set in maxOutputs.
  Responsibilities:
    Filter a set of ContentElements using a Feature.
    Derived from Filter
  Private Properties:
    feature: Feature=null
      Filtering pattern.
  Public Methods:
    FeatureFilter (sname: String=null, feat: Feature=null):
      Public constructor parameterized for string name and a Feature.
    setFeature (f: Feature=null): void
      Set the Filter's feature to use as a filter pattern.
UserFilter
  Description:
    This Filter interfaces to the current user's user model (as specified by the StoryEngine). It utilizes the user model's feature vector to filter content elements from the input ContentElements.
  Responsibilities:
    Filter a input set of ContentElements using a UserModel.
    Derived from Filter
  Private Properties:
    user: UserModel=null
      References current user model.
  Public Methods:
    UserFilter (sname: String=null, um: UserModel=null):
      Public constructor parameterized for string name and a UserModel.
    setUserModel (um: UserModel=null):
      Set the UserModel for the Filter.
RuleFilter
  Description:
    This class is a rule-based filter that applies a predicate operation, that in turn applies either a THEN or ELSE filter.
  Responsibilities:
    Apply a predicate operation and branch to one of two filters.
    Derived from Filter
  Private Properties:
    thenFilter: Filter=null
      If predicate results in true, apply thenFilter.
    elseFilter: Filter=null
      If predicate results in false, apply the elseFilter.
  Public Methods:
    RuleFilter (sname: String=null, tFilter: Filter=null, eFilter: Filter=null):
      Public constructor parameterized for a string name, a THEN filter, and a ELSE filter.
    setTHEN (filter: Filter=null)
      Set the THEN filter.
    setELSE (f: Filter=default)
      Set the ELSE filter of the RuleFilter.
    predicate( ): boolean
      This operation executes its code and returns a boolean result. This operation needs to be redefined by concrete subclasses.
Scene
  Description:
    This is a composite Filter composed of other Filters. This Filter provides the capability to construct hierarchically layered set of Filters and their associated ContentElements.
    Evaluating a Scene results in its outputs residing in the outputs of the contained filters. This is one of the main differences between a Scene and other CollectionFilters.
    The second main difference is that a Scene is the only presentable Filter. In order for any Filter to be presented, it must be embedded in a Scene.
    This Filter supports the abstraction of services, presentations.
  Responsibilities:
    Aggregates a set of filters.
    Interface for presenting a story.
    Derived from CollectionFilter
  Private Properties:
    presentation: Presentation=null
      The presentation responsible for rendering the Scene.
  Public Methods:
    Scene (sname: String=null):
      Public constructor parameterized for string name.
    setPresentation (p: Presentation=null): void
      Set the dependent Presentation of this Scene.
AndFilter
  Description:
    The AndFilter is basically a union set operator. It takes 2 or more filters. The combined results of the evaluation of this Filter are stored in its outputs.
  Responsibilities:
    ANDing the results of 2 or more contained Filters.
    Derived from CollectionFilter
  Public Methods:
    AndFilter (sname: String=null):
      Public constructor parameterized for a string name.
OrFilter
  Description:
    The OrFilter is basically a union set operator. It takes 2 or more filters. The combined results of the evaluation of this Filter are stored in its outputs.
  Responsibilities:
    ORing the results of the 2 or more contained Filters.
    Derived from CollectionFilter
  Public Methods:
    OrFilter (sname: String=null):
      Public constructor parameterized for a string name.
TemporalScene
  Description:
    This Scene has a special capability to sequence its contained Filters' associated ContentElements, i.e., outputs. By defining a playout duration, each contained Filter's ContentElements will be presented one at a time. Optionally, the temporal playout can be repeated for a specified number of times.
    This requires that a Presentation be able launch a timer that ultimately returns a TimeoutEvent to this Scene via the StoryEngine.
  Responsibilities:
    Specifies a temporal playout of the resulting set of filtered ContentElements.
    Derived from Scene
  Private Properties:
    duration: TimeUnit=null
      The duration of the Scene.

repeating: boolean
   Indicate if Scene will repeat its temporal playout.
numReps: integer=−1
   Indicates the number of repetitions of the playout.
Public Methods:
TemporalScene (sname: String=null, interval: TimeUnit= null, repeat: boolean=false, numreps: integer=−1):
   Public constructor parameterized for time interval, indication if allowing repetitions, and the number of repetitions.
setDuration (time: TimeUnit=null): void
   Set the duration of playout for each contained ContentElement.
repeating (flag: boolean=null): void
   Indicates if the temporal playout will be repeating.
setReps (reps: integer=−1): void
   Set the number of repetitions of the temporal playout.

StoryEvent
   Description:
   This class represents events of interests to StoryElements. The PresentationEngine is responsible for listening for events. Any StoryEvents are forwarded to the StoryEngine and ultimately to the Scene and the appropriate subcomponents.
   Responsibilities:
   Represent the event of user or story action (timer) that occurred on a ContentElement.
   Private Properties:
   timestamp: Timestamp=null
      Indicates the time of event occurrence.
   Public Methods:
   StoryEvent (tstamp: TimeStamp=null):
      Public constructor parameterized for timestamp.

UserSelectionEvent
   Description:
   This event occurs when a user activates an Anchor.
   Responsibilities:
   Represent a user action of selection.
   Derived from StoryEvent
   Private Properties:
   anchor: Anchor=null
      Indicates selected Anchor.
   Public Methods:
   UserSelectionEvent (a: Anchor=null):
      Public constructor parameterized for a Anchor.
   getAnchor( ): Anchor
      Retrieve Anchor object associated with this event.

TimeoutEvent
   Description:
   This event occurs when a timer has expired. A timer is called for by a TemporalFilter and is realized by a Presentation-side Timer object.
   Responsibilities:
   Represent a timeout event for a ContentElement.
   Derived from StoryEvent
   Private Properties:
   scene: TemporalScene=null
      Indicates the original TemporalScene that initiated the timer request that has now expired.
   Public Methods:
   TimeoutEvent (f: Filter=null)
      Public constructor parameterized for a filter (i.e., TemporalScene).

StoryEngine
   Description:
   This class is the system-level interface to the story subsystem.
   Responsibilities:
   1. Execution engine for assembling StoryElements based on a Story Model.
   2. Maintains history of played Filters.
   3. Tracks current Filter.
   4. Interfaces to the UserModeling system.
   5. The StoryEngine also interfaces to the global pool of ContentElements.
   It supplies these elements by default to the Filters' inputs.
   Private Properties:
   currentFilter: Filter=null
      Indicates currently executing Filter.
   umMgr: UMMgr=null
      Access to a UMMgr that interface to the UserModel pool.
   playHistory: Set of Filter=null
      The set of Filters played out during the session.
   Public Methods:
   StoryEngine (umMgr: UMMgr=null):
      Public Constructor parameterized for a UMMgr.
   assemble (scene: Scene=null): boolean
      Startup the composition of the current Scene. It in turn calls the Scene's evaluate operation that triggers the Scene recursively to trigger the evaluation of its contained Filters.
   dispatchEvent (event: StoryEvent=null): Scene
      Dispatch the StoryEvent, originally forwarded by the PresentationEngine, to the current Scene. This operation calls Scene's handleEvent operation.
      This operation ultimately returns a new Scene that the StoryEngine executes to continue the playout of the story.
   init( ): boolean
      Initialize StoryEngine including:
         Load the "story database"
         Retrieve a UserModel from UserModelManger.

Anchor
   Description:
   This class is representing an anchor that links to a source Filters and sink Filter. The location of anchor is set in the sourceFilter attribute. Its destination is set in the destinationFilter attribute.
   Most importantly, the destination can be determined at playout time, i.e., run-time.
   Responsibilities:
   Maintain a link between two Filters
   Private Properties:
   sourceFilter: Filter=null
      This is the source Filter of the Anchor.
   destinationFilter: Filter=null
      This is the sink Filter for the Anchor.
   Public Methods:
   Anchor (anchorName: String=null):
      Public constructor parameterized for string name.
   Anchor (anchorName: String=null, srcFilter: Filter=null, dstFilter: Filter=null):
      Public constructor parameterized for a string name, a source Filter, and a destination Filter.
   setSource (source: Filter=null): void
      Set the source Filter of the Anchor.
   setDestination (dest: Filter=null): void Set the destination Filter of the Anchor.

getSource( ): Filter
Get the source Filter.

getDestination( ): Filter
Get destination Filter.

read (istream: InputStream=null): void
Read an Anchor from a InputStream (language-specific).

write (ostream: OutputStream=null): void
Write a Anchor to a OutputStream (language-specific).

Presentation Engine Subsystem Classes

Figures 1, 23:
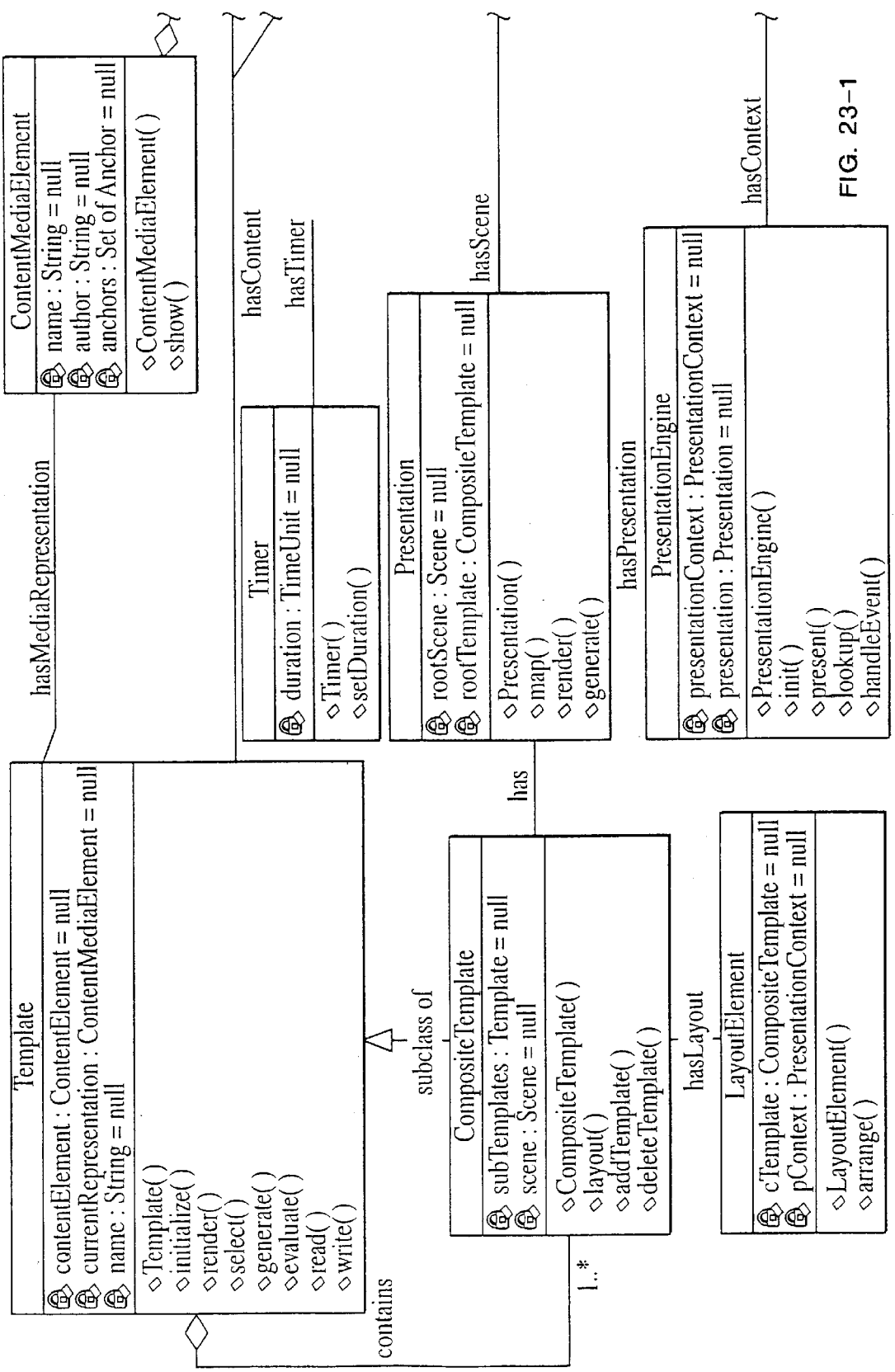
FIG. 23 (consisting of FIGS. 23-1 and 23-2) is a presentation engine class diagram according to the present invention.

FIG. 23 shows an exemplary PresentationEngine class diagram according to the present invention. The following provide descriptions of exemplary base classes shown in FIG. 23. The Presentation Engine may consist of a presentation generator, and a library of presentation components that may be matched up with the corresponding application elements (i.e., story elements) that will compute the final presentation form of the content elements.

Template
  Description:
    This is an abstract class that maps to a StoryElement. This class needs to be specialized to define appropriate presentation properties in accordance with the target delivery platform (e.g., HTML Template).
  Responsibilities:
    The primary responsibility of Template is to determine which representation (ContentMediaElement) of the associated ContentElement to render.
  Private Properties:
    contentElement: ContentElement=null
      The ContenetElement to be presented/rendered.
    currentRepresentation: ContentMediaElement=null
      Currently selected representation of the associated ContentElement.
    name: String=null
      string-based identification of the Template.
  Public Methods:
    Template (contentElement: ContentElement=null, context: PresentationContext=null):
      Public constructor parameterized for its associated StoryElement and a PresentationContext.
    initialize( ): void
      Initialization sets the Template ready for generation.
      A Template can be called upon successively to regenerate itself and select an alternative ContentRepresentation.
    render( ): void
      Format or display the final form of the Template to the target environment.
    select (context: PresentationContext=null): ContentRepresentation
      Heuristic-based selection of a ContentRepresentation from the Template's associated ContentElement's pool of representations Selection based on original design intent and the PresentationContext.
    generate( ): boolean
      Top-level operation to generate a candidate form of the Template. This operation calls upon select( ). Returns true if successful.
    evaluate( ): boolean
      Given the current PresentationContext, this operation evaluates the Template in its candidate form to determine if its acceptable.
    read (istream: InputStream=null): void
      Read a Template from InputStream (language-specific).
    write (ostream: OutputStream=null): void
      Write a Template to OutputStream (language-specific).

CompositeTemplate
  Description:
    This class is an aggregate that maintains and represents a set of Templates. This class enables hierarchical-structured, recursive, presentations. This class typically maps to a Scene in the StoryElement domain. CompositeTemplate redefines render, select, generate, and evaluate operations.
  Responsibilities:
    Represent and manage the final form of the contained Templates. Calls upon contained Templates to iteratively generate their final form to satisfy the design intent and constraints of the CompositeTemplate.
    Working with a LayoutElement computes candidate layout of the contained parts.
  Key Capability:
    Embodied with "smarts" to join or split contained original set of Templates depending on the design intent of a subclass. This capability is a cooperative process with a LayoutElement who is a spatial layout expert.
  Derived from Template
  Private Properties:
    subTemplates: Template=null
      The set of contained Templates that a CompositeTemplates manages.
    scene: Scene=null
      Associated Scene object.
  Public Methods:
    CompositeTemplate (scene: Scene=null, name: String=null, context: PresentationContext=null):
      Public constructor parameterized for a Scene, string name, and a PresentationContext.
    layout (layoutElement: LayoutElement=null): boolean
      Computes the layout of its contained templates in cooperation with a LayoutElement. The CompositeTemplate delegates to a LayoutElement the abstract task of computing a constraint-based layout, i.e., determines how to glue the content elements together, while the CompositeTemplate has the specific task of dictating a specified design style.
    addTemplate (tmpl: Template=null): void
      Add a Template to set of subTemplates.
    deleteTemplate (tmpl: Template=null)
      Delete a Template from the set of SubTemplates.

Presentation
  Description:
    This class encapsulates the rendering of a presentation of a Scene.
  Responsibilities:
    The primary responsibility of the Presentation class is to create the corresponding presentation object hierarchy that map the hierarchical structure of a Scene object
  Private Properties:
    rootScene: Scene=null
      The top-level scene associated with a Presentation.
    rootTemplate: CompositeTemplate=null
      The top-level CompositeTemplate associated with the rootScene.
  Public Methods:
    Presentation (scene: Scene=null, context: PresentationContext=null, id String=null):

Public constructor parameterized for a Scene, a name, and a PresentationContext.

map (scene: Scene=null): CompositeTemplate
: This operation basically constructs a tree comprised of templates that map to each StoryElement contained in a Scene and its subcomponents.
  This operation returns the root CompositeTemplate that maps to the root Scene.

render( ): void
: This operation in turn calls renders on its contained Templates.

generate( ): boolean
: This operation in turn calls generates on all contained templates to launch the generation of a Presentation.

Timer

Description:

This class presents a timer entity for showing a Presentation for a specific interval of time. A timeout event is spawned when a Timer has expires.

Responsibilities:

Represent a timer that spawns a timeout event.

Private Properties:

duration: TimeUnit=null
: Duration of timer

Public Methods:

Timer (presentation: Presentation=null, interval: TimeUnit=null):
: Public constructor parameterized for a Presentation and a length of duration.

setDuration (interval: TimeUnit=null): void
: Set the duration of the Timer.

LayoutElement

Description:

This is an abstract base class that is intended to coordinate the arrangement of the elements that makeup a CompositeTemplate.

Concrete subclasses need to define the appropriate operations and attributes dependent on the specific delivery environment (e.g., HTML, X Windows, set-top, etc.).

Responsibilities:

Spatially arrange a CompositeTemplate's elements.

Private Properties:

cTemplate: CompositeTemplate=null
: the CompositeTemplate whose elements are being arranged.

pContext: PresentationContext=null
: current PresentationContext.

Public Methods:

LayoutElement (compositeTemplate: CompositeTemplate=null):
: Public constructor parameterized for a CompositeTemplate and a PresentationContext.

arrange (cTmpl: CompositeTemplate=null): boolean
: This operation computes the spatial arrangement of a CompositeTemplate's elements.

PresentationEngine

Description:

The PresentationEngine is the system-level interface to the presentation system.

Responsibilities:

Determine PresentationContext.

Find most appropriate matching Presentation for the incoming Scene.

Hand off a StoryEvents back to the Application.

Private Properties:

presentationContext: PresentationContext=null
: The current PresentationContext for the given Presentation.

presentation: Presentation=null
: The current Presentation being generated/presented.

Public Methods:

PresentationEngine (userModelMgr: UMMgr=null):
: Public constructor parameterized for a UserModelManager.

init( ): void
: This operation loads the presentation database.

present( ): StoryEvent
: This operation includes the following steps:
  1. Invoke Scene lookup operation.
  2. Generate the currentPresentation.
  3. Wait for a StoryEvent and return it. lookup (scene: Scene=null): Presentation
  This operation attempts to match the scene from the StoryEngine to a corresponding Presentation that will have the most appropriate mapping to the Scene components.

handleEvent( ): StoryEvent
: This operation waits for a StoryEvent to be detected and subsequently returned to the application.

PresentationContext

Description:

This class represents the current snapshot of the delivery environment at any given moment during the generation of a Presentation. This component is like the UserModel is to the user's profile, as a PresentationContext is to a profile of the presentation environment.

Responsibilities:

Maintain a collection of attribute-value pairs that describe the delivery environment.

Private Properties:

featureVector: FeatureVector

Public Methods:

PresentationContext (id: String=null):
: Public constructor parameterized for a string name.

Content Model Classes

Figure 24:
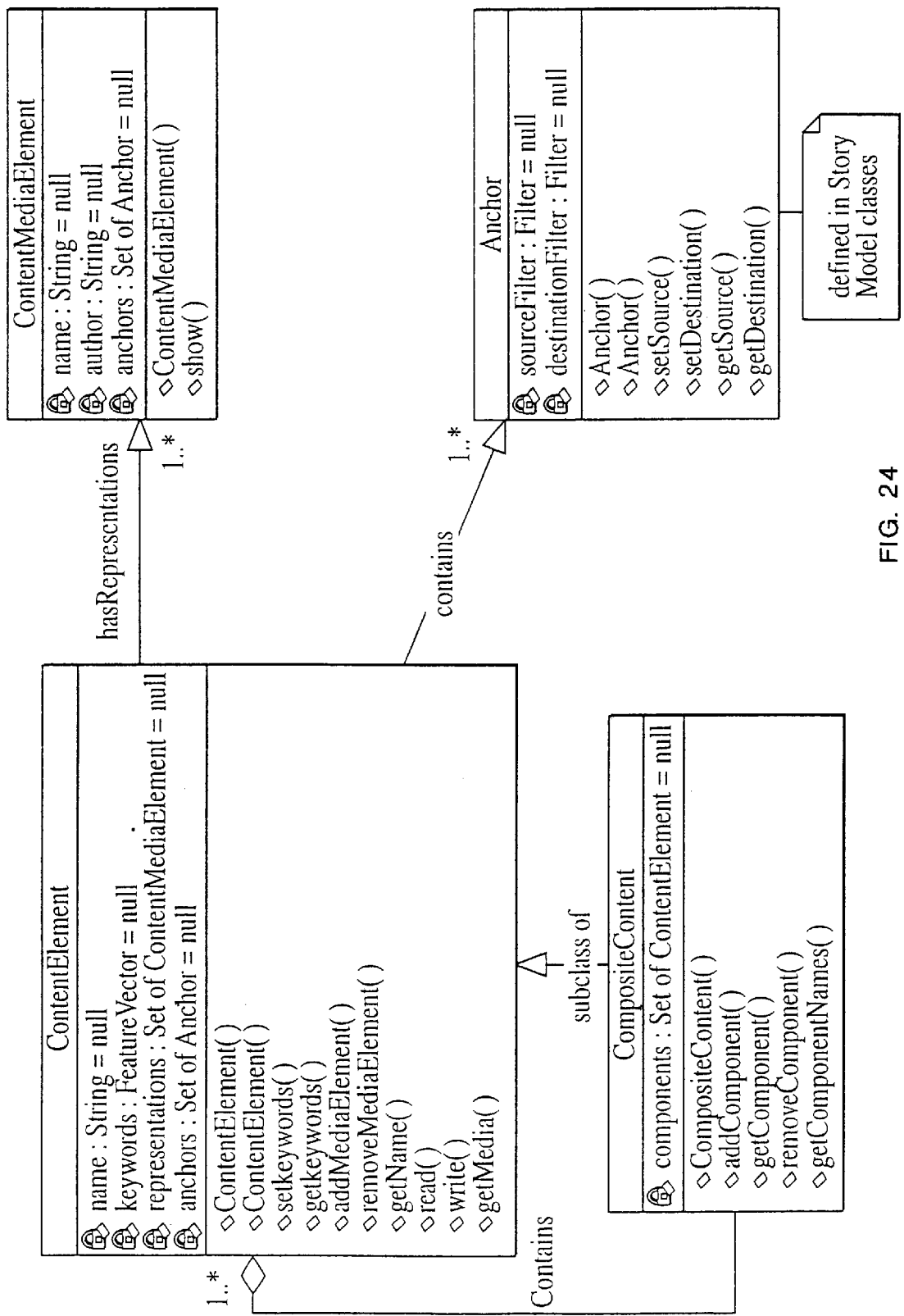
FIG. 24 is a content classes class diagram according to the present invention.

FIG. 24 shows an exemplary content class diagram according to the present invention. The following provide descriptions of exemplary base classes shown in FIG. 24.

ContentElement

Description:

ContentElement is the root class of the content model hierarchy. This class abstracts an element of content and maintains a set of ContentMediaElements, where each ContentMediaElement is a different representation of the ContentElement (e.g. text, image, etc.)

Responsibilities:

Multi-model representation of a element of content.

Integrate multiple representations of a element of content.

Private Properties:

name: String=null
: the name of the ContentElement.

keywords: FeatureVector=null
: utilizing feature vector to represent the semantic meaning.

representations: Set of ContentMediaElement=null
: different media representations of the ContentElement.

anchors: Set of Anchor=null

Public Methods:
ContentElement (cname: String=null):
Constructor 1
ContentElement (cname: String=null, keys: String[ ]=null):
Constructor 2
setKeywords (keys: String=null): void
Set the keywords of this ContentElement
getKeywords( ): FeatureVector
Get the feature vector of the ContentElement.
addMediaElement (cme: ContentMediaElement=null): void
Add a ContentMediaElement the ContentElement's set of media elements.
removeMediaElement (cme: ContentMediaElement=null): void
Remove the given ContentMediaElement from the ContentElement's set of media elements.
getName( ): String
Return the ContentElement's name.
read (istream: InputStream=null): void
Read a ContentElement from a InputStream (language-specific).
write (ostream: OutputStream=null): void
Write a ContentElement to a OutputStream (language-specific).
getMedia (i: integer=−1): ContentMediaElement
Get the ith ContentMediaElement contained in the set of representations.

CompositeContent
Description:
This class supports the creation of an aggregation of ContentElements.
Responsibilities:
Maintaining a set of ContentElement.
Derived from ContentElement
Private Properties:
components: Set of ContentElement=null
Public Methods:
CompositeContent (cname: String=null, keys: String[ ]=null, cmpnts: Set of ContentElement=null):
Public constructor parameterized for a string name, a set of keywords, and a set of subcomponents.
addComponent (c: ContentElement=null): void
Add a ContentElement to this CompositeContent's set of components.
getComponent (i: int=0): Content
Get the ith ContentElement contained in the component.
removeComponent (cmpnt: ContentElement=null): void
Remove a component from the components list.
getComponentNames( ): String[ ]
Get an array of component content names ContentMediaElement
Description:
This is a virtual class that defines general attributes and operations for ContentMediaElements. It will be implemented in Audio, Video, Image and Text subclasses.
This class basically acts as a wrapper class to media assets, hiding the details of the raw media.
Responsibilities:
Representation of a media asset (e.g., image, video segment, text segment).
Private Properties:
name: String=null
The name of the presentation
author: String=null
The author of the presentation
anchors: Set of Anchor=null
The set of associated anchors
Public Methods:
ContentMediaElement (cmeName: String, cmeAuthor: String):
Public constructor parameterized for a string name and string author's name.
show( ): void
Show the ContentMediaElement.

Figure 25:
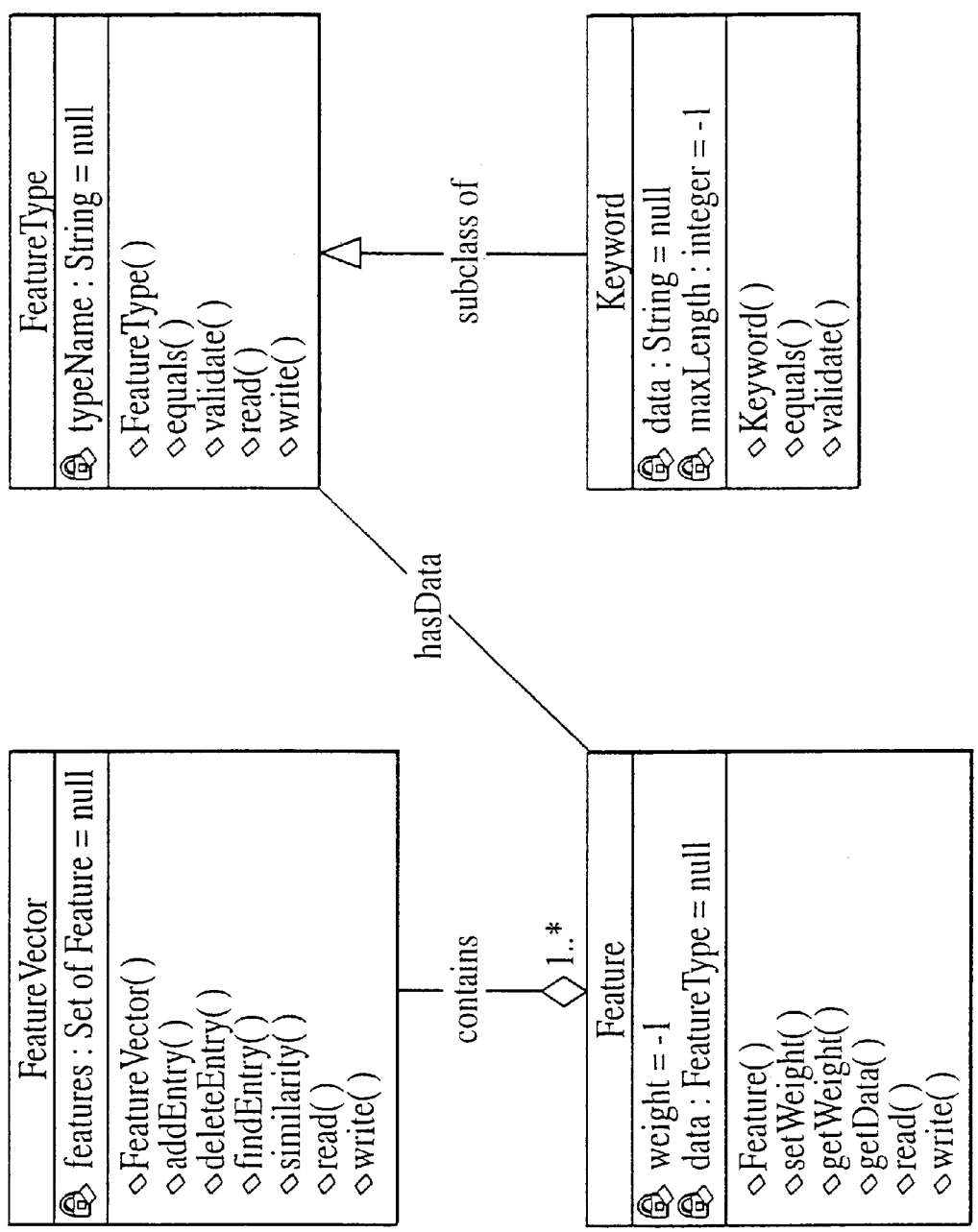
FIG. 25 is a metadata classes class diagram according to the present invention.

Metadata Model Classes
FIG. 25 shows an exemplary metadata class diagram according to the present invention. The following provide descriptions of exemplary base classes shown in FIG. 25.

FeatureType
Description:
This is the abstract base class for all FeatureTypes. FeatureType is a wrapper class that encapsulates one or more primitive datatypes that collectively provide more meaning.
For example, a FeatureType called homeLocation comprised of 4 strings that represent street address, city, state, and country of a user, or geoLocation comprised of two real numbers that represent the latitude and longitude of a location.
Responsibilities:
Abstract base class for types of features.
Private Properties:
typeName: String=null
The string name of this FeatureType.
Public Methods:
FeatureType (sname: String null):
Public constructor parameterized for a string name.
equals (object: Object=null): boolean
Determines if object is of a specific FeatureType.
validate( ): boolean
Determines if the FeatureType associated data is valid, e.g., string within length bounds.
read (istream: InputStream=null): void
Read a FeatureType from a InputStream (language-specific).
write (ostream: OutputStream=null): void
Write a FeatureType to OutputStream (language-specific).

Feature
Description:
This class represents a weighted data, more specifically, a weighted FeatureType instance. The assumption is that the "data" is rated in terms of importance on a real number scale from 0.0 to 1.0.
Responsibilities:
Represent a weighted attribute of interest.
Private Properties:
weight:=−1
The weight of importance/priority on a real number scale from 0.0. to 1.0.
data: FeatureType=null
The FeatureType instance that comprises the Feature.
Public Methods:
Feature (data: FeatureType=null, wt: float=null):
Public constructor parameterized for a datum and a weight.
setWeight (wt: float=−1): void Set the weight of the Feature.
getWeight( ): float
    Get the feature's weight.
getData( ): Object
    Get encapsulated FeatureType's data.
read (istream: InputStream=null): void
    Read a Feature from a InputStream (language-specific).
write (ostream: OutputStream=null): void
    Write a Feature to a OutputStream (language-specific).
FeatureVector
Description:
This class is a set of weighted Features. This class is a basic data structure for representing metadata.
Responsibilities:
Maintains a set of features.
Private Properties:
features: Set of Feature=null
    A set of features.
Public Methods:
FeatureVector( ):
    Public constructor.
addEntry (feat: Feature=null): void
    Add a Feature to the FeatureVector's set of Features.
deleteEntry (feat: Feature=null): void
    Delete Feature from FeatureVector's set of Features.
findEntry (feat: Feature=null): Feature
    Find the Feature in the FeatureVector's set of Features.
similarity (feat: Feature=null): float
    Compute numerical score indicating how similar/dissimilar two FeatureVectors are.
read (istream: InputStream=null): void
    Read a FeatureVector from a InputStream (language-specific).
write (ostream: OutputStream=null): void
    Write a FeatureVector to a OutputStream (language-specific).
Functional Design
Now the corporate web site exemplary embodiment will be used to discuss the functional aspects of creating, assembling and presenting an application using the architectural framework according to the present invention.

Figure 26:
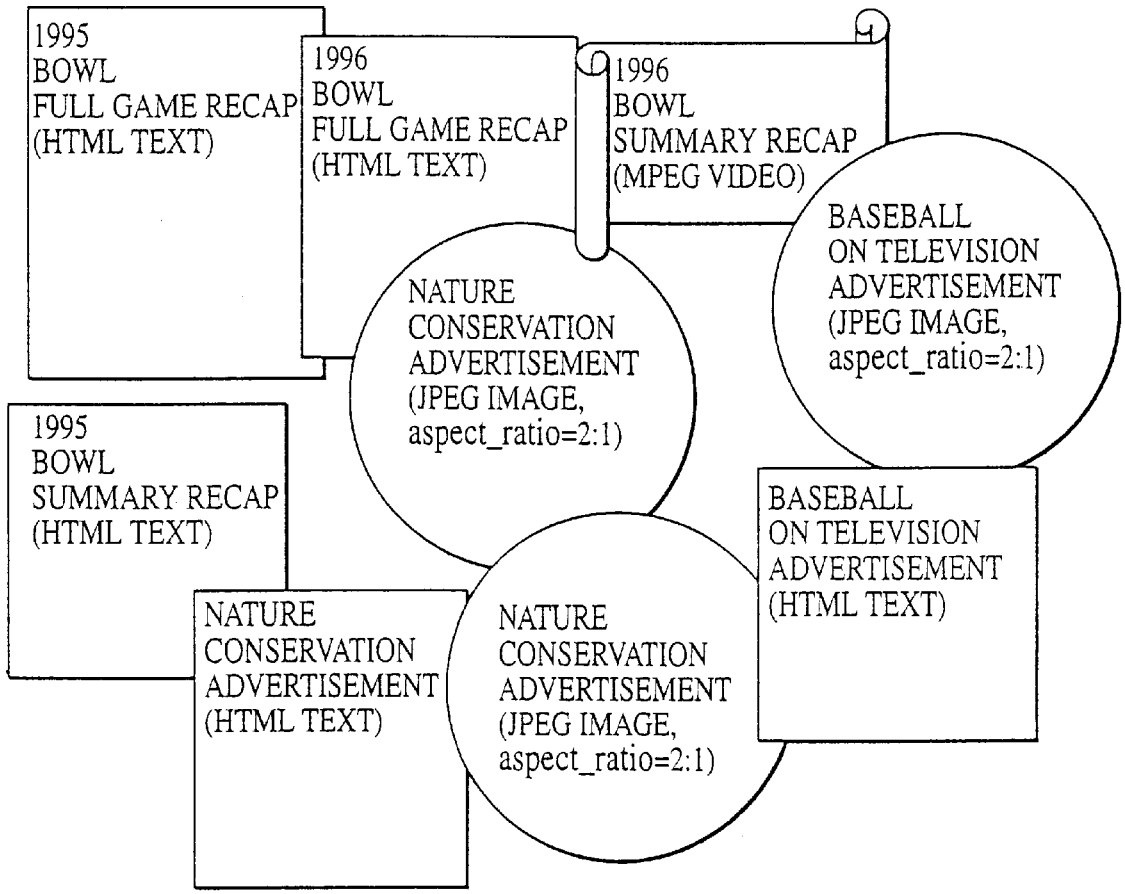
FIG. 26 is a block diagram of exemplary content database according to the present invention.

FIG. 26 shows an exemplary content database for the corporate web site according to the present invention. From this sparse set of content, a simple portion of a web service will be designed. The database contains content elements with varying representation. In some cases, the content element has multiple representations of the same type but with different media characteristics, e.g., the Nature Conservation Ad has two image representations but with differing specification for aspect ratio. The more varied the database in terms of types of representations and the number of versions of the same type of representation, the more contextual delivery of content for the user.

A story model will be described by using the exemplary web base service to show how a hierarchical organization of filters creates modular highly complex applications that are assembled dynamically, shaped by the characteristics of the current user and the available content.

Figure 27:
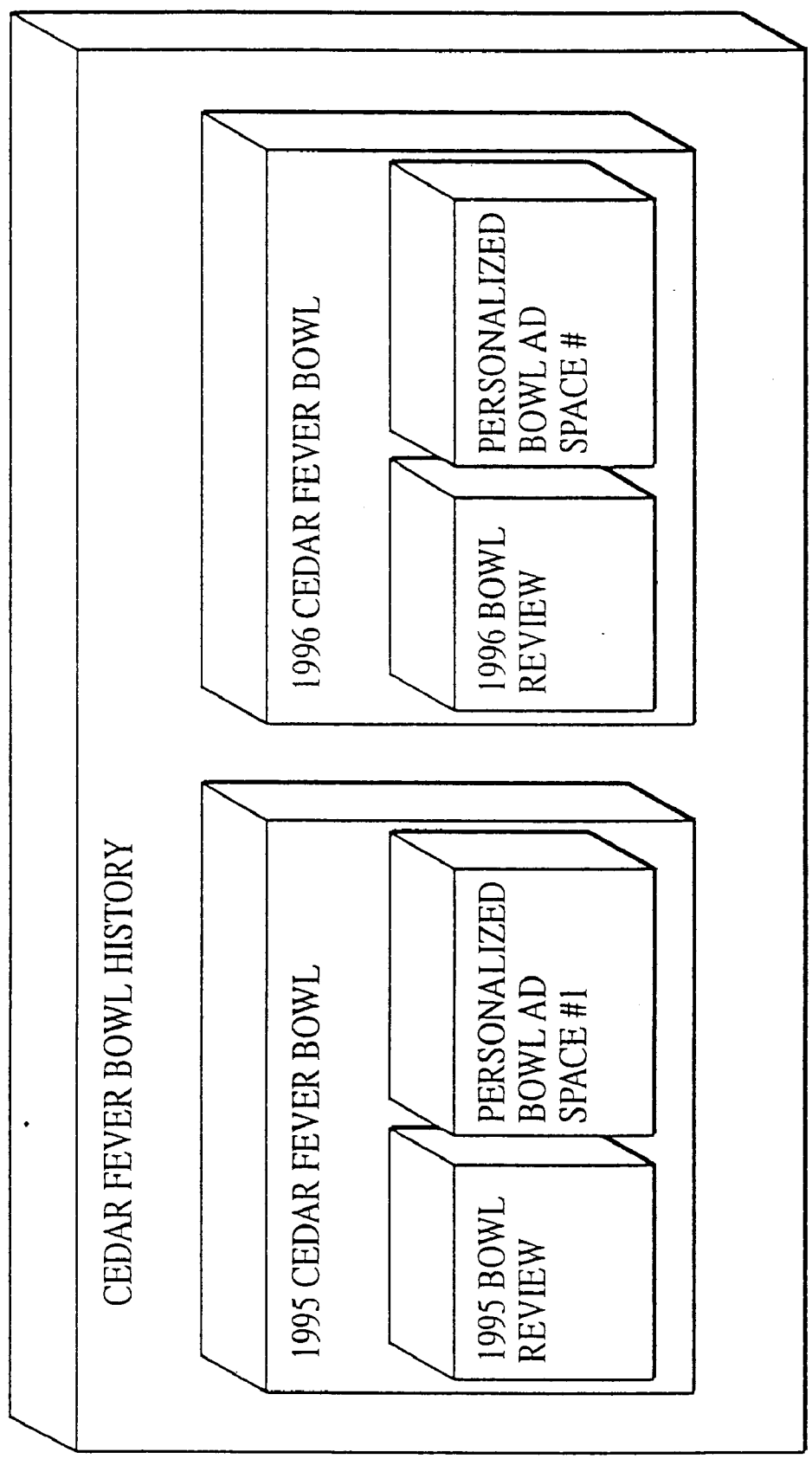
FIG. 27 is a block diagram of a high level view of an exemplary web-based service.

FIG. 27 shows a block diagram of a high level view of a portion of the exemplary web base service. This portion focuses on the element of the story that presents information on the history of the Cedar Fever Bowl. The history of the bowl game goes back to 1995 and the intent of an imaginary web development team is to show a recap of each game (1995, 1996) and associate an advertisement alongside each game history recap. The development team develops a story model that further expands the block diagram shown in FIG. 27. Each game review is developed as a separate component and, therefore, each element is a self-contained independent aggregate of information. The architectural framework according to the present invention supports the development of bottom up services and reusable story elements. The 1995 game review will consist of a summary of the 1995 game and an advertisement that best matches the current user's user model. The 1996 game review will consist of a summary of the 1996 game and an advertisement that best matches the current user's user model but that has not been previously reviewed by the user in the current session, otherwise, an advertisement that simply is sports related.

Figure 28:
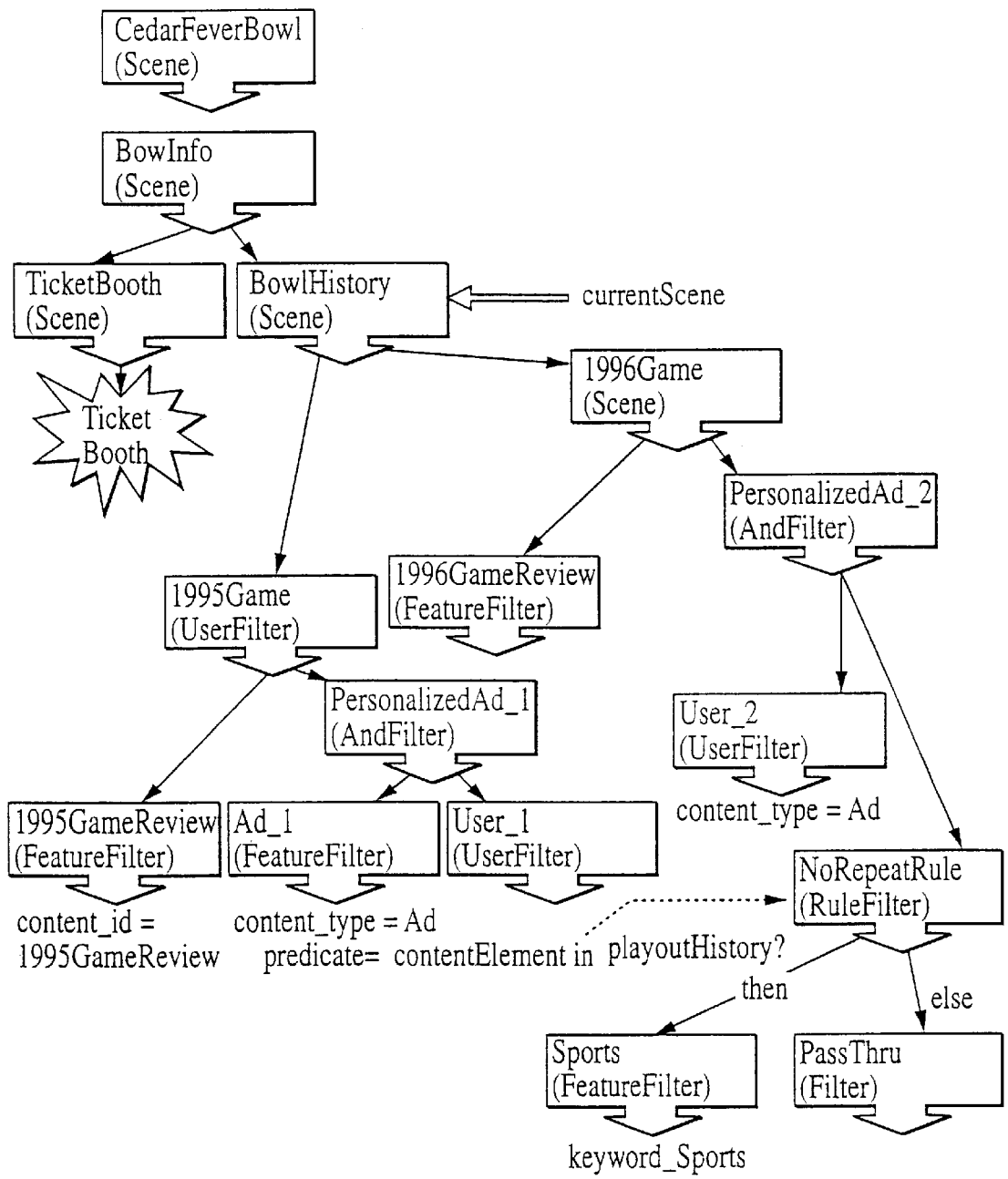
FIG. 28 is a flowchart of an exemplary story model according to the present invention.

FIG. 28 shows the resulting story model. By using FeatureFilters, one can select specific content elements by referring to their content_id. UserFilters filter content elements that match a user's user model, returning a prioritized set of content elements sorted by one level of similarity. Since a story model is developed, the next step is to develop or reuse presentation components that will be designated to present the simple story.

Figure 29:
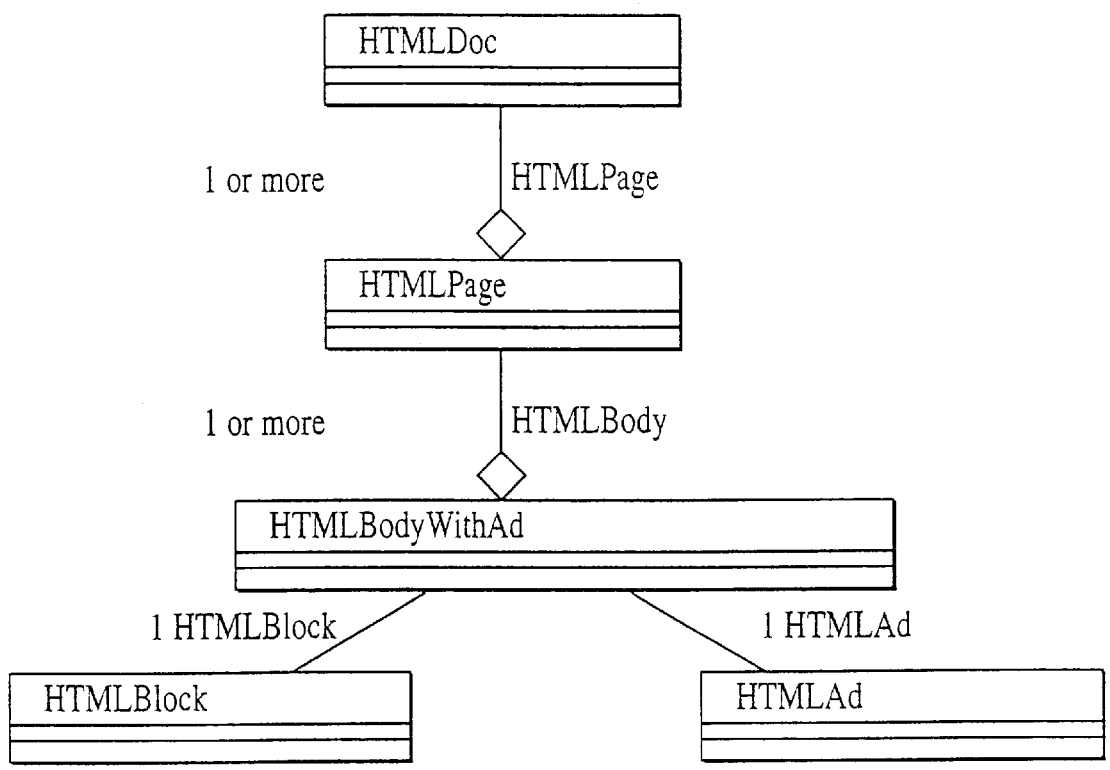
FIG. 29 is a flowchart of exemplary HTML presentation templates according to the present invention.

In order to illustrate the presentation aspects of the web service example, a set of presentation templates that encapsulate the HTML delivery environment are developed. In the presentation domain, there are two types of presentation templates, a Template and a CompositeTemplate. A CompositeTemplate represents a set of Templates. Non-composite Templates are mapped to Content Elements. Composite Templates are mapped to Scenes (a composite ContentElement). In the creation of a presentation, Templates call upon their associated ContentElements and retrieve the best representation of the element in the context of the current delivery environment. A CompositeTemplate ensures that given its real estate its subcomponents are intelligently laid out with the best-suited media representation of a ContentElement (ContentMediaElement). To further illustrate, an example set of presentation components are shown in FIG. 29. These example components are not fully specified, but they illustrate what is expected of a presentation component.

In this example presentation model, HTMLDoc, HTMLPage, and HTMLBody are CompositeTemplates, while HTMLBlock and HTMLAd are non-composite Templates. The semantics of the components are loosely the following: (1) a HTMLBodyWithAd will always require 1 HTMLBlock and 1 HTMLAd; (2) A HTMLPage can contain 1 or more components of type HTMLBody; and (3) by default, a HTMLDoc contains one HTMLPage. Additionally, a HTMLDoc maps to one Scene object. More importantly, if a HTMLDoc determines that one HTMLPage is insufficient to present a Scene, it may for example, dynamically allocate two HTMLPages and mapping to one StoryElement. This last point demonstrates the power and flexibility of the architectural framework according to the present invention, if designed and implemented correctly.

Generally the execution process from a high level view for assembling a story, generating a presentation that shows the story, and handling any user events includes:
    Creating and initializing a UserModelManager;
    Creating and initializing a StoryEngine;
    Creating and initializing a PresentationEngine;
    Selecting an story element (i.e., Scene) to be the initial element of the story;
    Calling upon the StoryEngine to assemble a "story" given the initial element;

Upon the StoryEngine completing its assembly task, calling upon the PresentationEngine to present the "story";

Dispatching a story-relevant event to the StoryEngine to determine the next story element (Scene) to play; and Based on the outcome of the event, set the next story element (Scene) to be assembled and subsequently presented.

The following illustrates the assembling of a scene for the exemplary web service example, the 1996Game, contained in the BowlHistory Scene. Initially, it is assumed that the Story Model at this point has been constructed and mapped with the appropriate ContentElements. The StoryEngine starts off the assembly of the 1996Game Scene. Each successive Scene calls upon their contained Filters resulting in a depth-first traversal of the filter hierarchy. Each Scene supplies its inputs to its contained Filters. This is the default execution behavior, which may be overridden by the application designers implementing their own base CompositeTemplate class that redefines the execution semantics.

Specifically, the 1996GameReview, a FeatureFilter, is calling for a content element with the feature, "content_id=1996GameReview" which is an explicit call for a specific ContentElement. Next, the element named PersonalizedAd_2, an AndFilter, is retrieving advertisements that have the feature "content_type=Ad" and that favorably match the user's UserModel. Having met these constraints, the last Filter, a RuleFilter, checks to see if the ContentElements that have resulted from the two previous Filters (within the AndFilter) are on the StoryEngine's already-played list. If all have been "played", one content element from that current set that has the feature is selected, "keyword=sports", otherwise any one ContentElement from the current set is chosen.

The AndFilter feeds the set of ContentElements resulting from each contained Filter to the next, which differs from the Scene Filter that simply supplies the same inputs to each contained Filter. Additionally, when the UserFilter is executed, it retrieves the user's UserModel via the UMMgr (user model manager) to carry out its execution.

Figure 30:
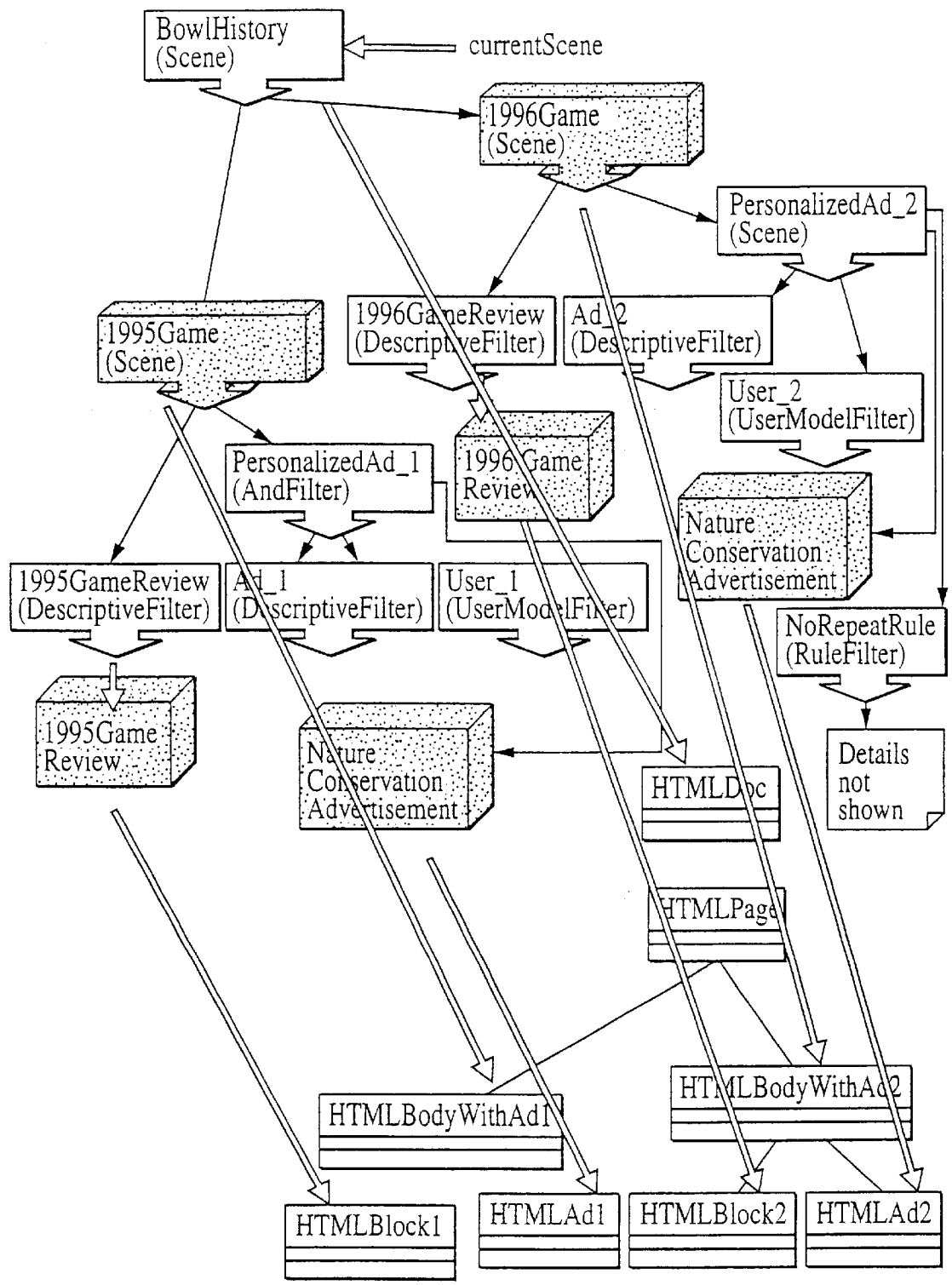
FIG. 30 is a flowchart of generation of a presentation structure according to the present invention.

To generate a final presentation of a Scene, it is assumed that the process of mapping the story elements to the presentation elements has already occurred and its outcome is shown partially in FIG. 30. The process of rendering (actually displaying the presentation) is not shown or described.

In generating a presentation, we have a hierarchical structure that maps to the hierarchical structure in the StoryModel. Once again, the structure is traversed in a depth-first manner. Each non-composite template (leaf element in the hierarchy) selects one ContentMediaElement object that represents the template's associated ContentElement. Once a CompositeTemplate's sub-components have satisfactorily selected their ContentMediaElements, the CompositeTemplate calls upon a LayoutElement to arrange the layout of these sub-components. Once a layout is generated, the CompositeTemplate evaluates the candidate presentation based on its criteria as defined in a concrete class. If satisfied, control is passed back to its containing template, and the whole process starts all over again for the siblings in the hierarchy. Eventually, control returns to the top-level, and if all else evaluated satisfactorily, the overall presentation is ready to be rendered.

In general, the rendering process simply involves traversing the presentation hierarchy and invoking the show( ) operation on the finally selected ContentMediaElement, and displaying the hierarchy as specified by its CompositeTemplate and its LayoutElement.

Figure 31:
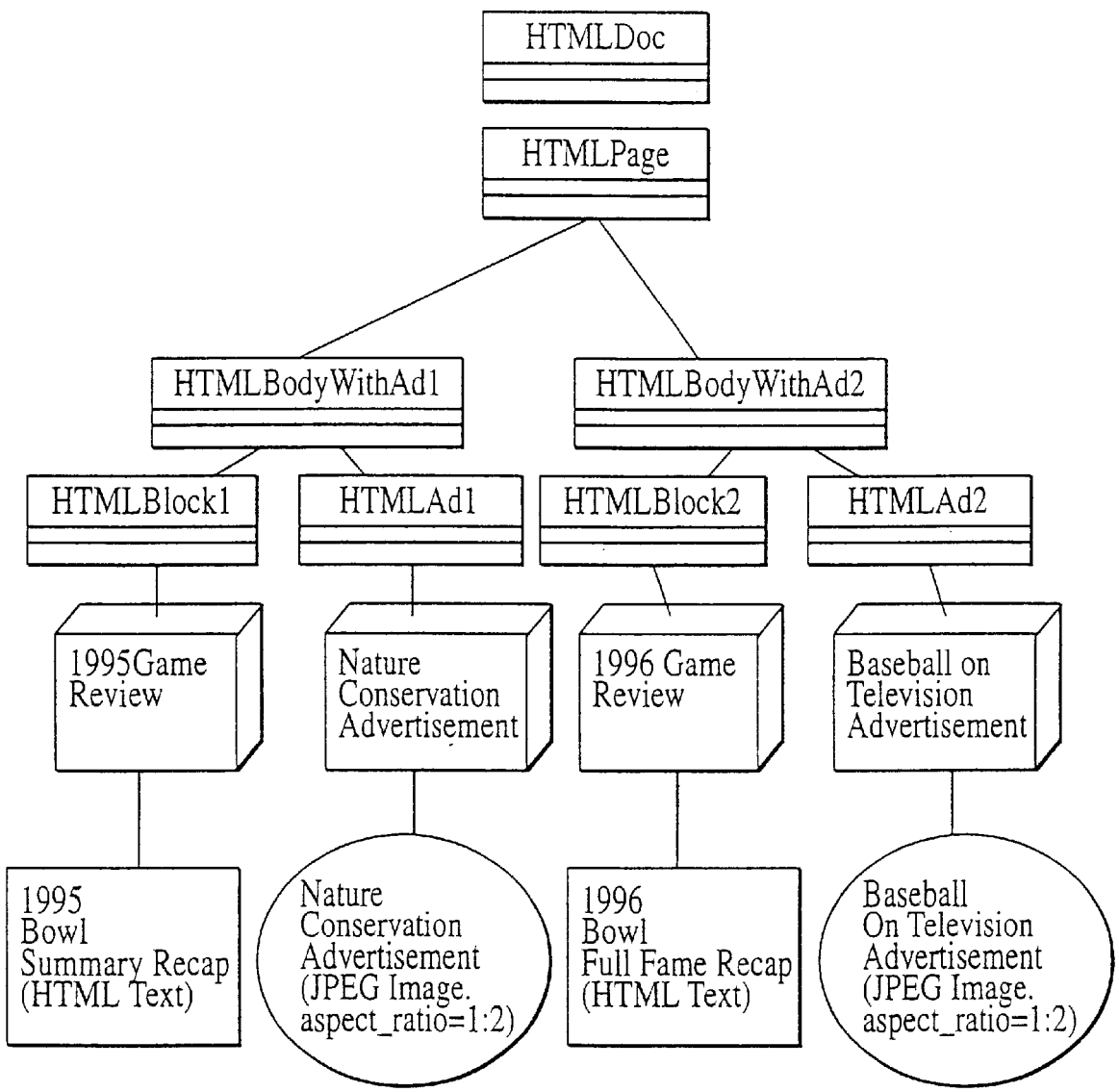
FIG. 31 is a flowchart of an exemplary final form of a presentation of a scene according to the present invention.

If any step in the previously described process of evaluation fails, i.e., a CompositeTemplate is not satisfied with the selection of the media representations and/or the layout of its subcomponents, the CompositeTemplate then pushes back on the contained templates to choose alternate media representations of its associated ContentElement. This process involves an iterative generation of the final form of the presentation. The final presentation form is shown in FIG. 31.

To dispatch a Story-specific event, it is assumed that the presentation of a story (i.e., Scene) has been successfully rendered by this point. As previously described, ContentElements have associated anchors that surface on a ContentElement because of their relationship with ContentMediaElements. When an event occurs in the PresentationEngine that has relevance to the StoryEngine (i.e., a UserSelectionEvent, a TimeoutEvent), the event is forwarded to the current Scene. The Scene object decodes the event to extract the next Scene to be assembled and presented and whole process starts over.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein, rather, the present invention extends to all functionally equivalent structures, methods and uses, such as are within the scope of the appended claims.

What is claimed:

1. A method for creating and delivering an interactive multimedia application configured to dynamically adapt to at least one user, the method comprising:

creating a story engine by the interactive multimedia application;

creating a user model manager by the interactive multimedia application;

providing the story engine with application-specific information and user information;

providing the story engine with a user model from the user model manager, the user model representing interests and trends of the at least one user;

providing the story engine with a narrative structure defined by semantics of the interactive multimedia application;

producing user-relevant content by filtering a content model, the user model being usable for the filtering;

creating a presentation engine by the interactive multimedia application;

providing the presentation engine with the narrative structure, uninitialized content mode, and a presentation model, the uninitialized content model being empty;

generating an abstract presentation defined by the presentation model, the abstract presentation being generated by the presentation engine;

generating a concrete presentation by using at least heuristics of the abstract presentation, the concrete presentation being generated by the presentation engine; and displaying the concrete presentation by the presentation engine;

wherein the abstract presentation and the presentation engine autonomously handle interaction scenarios, and the interests and trends of the at least user are periodically updated based on an interaction history and the user model, the interactive multimedia application being self-improving and self-sustaining.

2. The method according to claim 1, the interactive multimedia application being created using object-oriented design techniques.

3. The method according to claim 2, the interactive multimedia application being using JAVA.

4. A method for delivering a dynamically adaptive, interactive multimedia application comprising:

creating a user model manager that generates a user model representing at least one of interests and trends of a user;

creating a story engine that receives information specific to the multimedia application and the user model, the story engine generating a story based on at least one of the multimedia application information and the user model;

creating a presentation engine that receives the story from the story engine and a presentation model, the presentation engine generating an abstract presentation, defined by at least the presentation model, and a concrete presentation using at least heuristics of the abstract presentation; and displaying the concrete presentation.

5. The method for delivering a dynamically adaptive, interactive multimedia application according to claim 4, further comprising:

receiving user feedback; and updating the user model based on the user feedback.

6. The method for delivering a dynamically adaptive, interactive multimedia application according to claim 4, further comprising:

receiving user feedback; and updating the story based on the user feedback.

7. The method for delivering a dynamically adaptive, interactive multimedia application according to claim 4, in which the multimedia application information comprises at least one of a content model and a story model.

8. A computer readable medium for storing a computer program that builds and presents a multimedia application, the computer readable medium comprising:

a user modeling source code segment that creates a user model manager for generating at least one user model for each user, the at least one user model representing interests and trends of the corresponding user;

a story source code segment that creates a story engine for receiving information specific to the multimedia application and the at least one user model, and generating a story based on at least one of the multimedia application information and the user model;

a presentation source code segment that creates a presentation engine for generating an abstract presentation, based on a presentation model and the story generated by the story engine, and generating a concrete presentation based on the abstract presentation; and a display source code segment that enables display of the concrete presentation.

9. The computer readable medium according to claim 8, in which the user modeling source code segment creates the user model by gathering data from the user; analyzing a use history of the user; monitoring data related to the user; and detecting patterns of the user.

10. The computer readable medium according to claim 8, in which the information specific to the multimedia application comprises information that is able to be represented via at least one media type.

11. The computer readable medium according to claim 8, in which the presentation source code segment accounts for a narrative style, a narrative context and a demand of the presentation delivery environment.

\* \* \* \* \*

UNITED STATES PATENT AND TRADEMARK OFFICE
CERTIFICATE OF CORRECTION

PATENT NO.   : 6,694,482 B1
DATED        : February 17, 2004
INVENTOR(S)  : J. Arellano et al.

It is certified that error appears in the above-identified patent and that said Letters Patent is hereby corrected as shown below:

Column 39,
Line 5, after "least" insert -- one --.
Line 13, after "being" insert -- created --.

Signed and Sealed this

Fifth Day of October, 2004

JON W. DUDAS
*Director of the United States Patent and Trademark Office*